(12) United States Patent
Heusser et al.

(10) Patent No.: US 10,471,640 B2
(45) Date of Patent: Nov. 12, 2019

(54) METHOD AND DEVICE FOR THE MANUFACTURE OF ANNULAR EXTRUDATES

(71) Applicant: Promix Solutions AG, Winterthur (CH)

(72) Inventors: Rolf Heusser, Winterthur (CH); Frank van Lück, Kaarst (DE)

(73) Assignee: Promix Solutions AG, Winterthur (CH)

( * ) Notice: Subject to any disclaimer, the term of this patent is extended or adjusted under 35 U.S.C. 154(b) by 479 days.

(21) Appl. No.: 15/168,397

(22) Filed: May 31, 2016

(65) Prior Publication Data

US 2016/0346985 A1 Dec. 1, 2016

(30) Foreign Application Priority Data

Jun. 1, 2015 (EP) .................................. 15170179

(51) Int. Cl.
*B29C 47/86* (2006.01)
*B29C 47/12* (2006.01)
*B29C 48/86* (2019.01)
*B29C 48/30* (2019.01)

(52) U.S. Cl.
CPC ............ *B29C 48/865* (2019.02); *B29C 48/30* (2019.02)

(58) Field of Classification Search
CPC . B29C 47/862; B29C 47/362; B29C 47/0837; B29C 47/0023; B29C 47/705; B29C 47/12; B29C 47/20; B29C 47/0828; B29C 47/0042; B29C 47/864; B01F 5/0619; B01F 2005/0637; B29B 7/007; B29B 7/325; B29B 7/7466; B29B 7/7485; B29B 7/88

See application file for complete search history.

(56) References Cited

U.S. PATENT DOCUMENTS

| | | | | |
|---|---|---|---|---|
| 4,201,480 A | * | 5/1980 | Brand | ................... B29C 47/362 264/53 |
| 4,574,067 A | * | 3/1986 | Cerny | ................... B29C 48/362 264/209.8 |
| 4,746,477 A | | 5/1988 | Wecker | |
| 2015/0087733 A1 | * | 3/2015 | Heusser | .............. B29C 44/3415 521/79 |

FOREIGN PATENT DOCUMENTS

| | | |
|---|---|---|
| EP | 0 850 745 A1 | 7/1998 |
| EP | 2 103 411 A1 | 9/2009 |
| EP | 2 103 411 A9 | 3/2010 |

* cited by examiner

*Primary Examiner* — Robert J Grun
(74) *Attorney, Agent, or Firm* — Francis C. Hand; Carella, Byrne, et al

(57) ABSTRACT

A device (4) for the manufacture of an annular extrudate comprises a jacket (2), a crosshead (1) arranged inside of the jacket. The jacket contains a melt passage, whereby the crosshead is arranged in the melt passage, such that the melt passage extends et least at the outlet of the device as an annular melt passage around the crosshead (1). An annular passage (5) is formed between the crosshead and the jacket. The annular passage contains a static mixer (3), whereby the crosshead is at least partially supported by the static mixer in the jacket. The static mixer comprises a plurality of inserts, whereby at least a portion of the inserts is connected to the crosshead and/or the jacket.

16 Claims, 11 Drawing Sheets

Prior Art

Prior Art

Prior Art

Prior Art

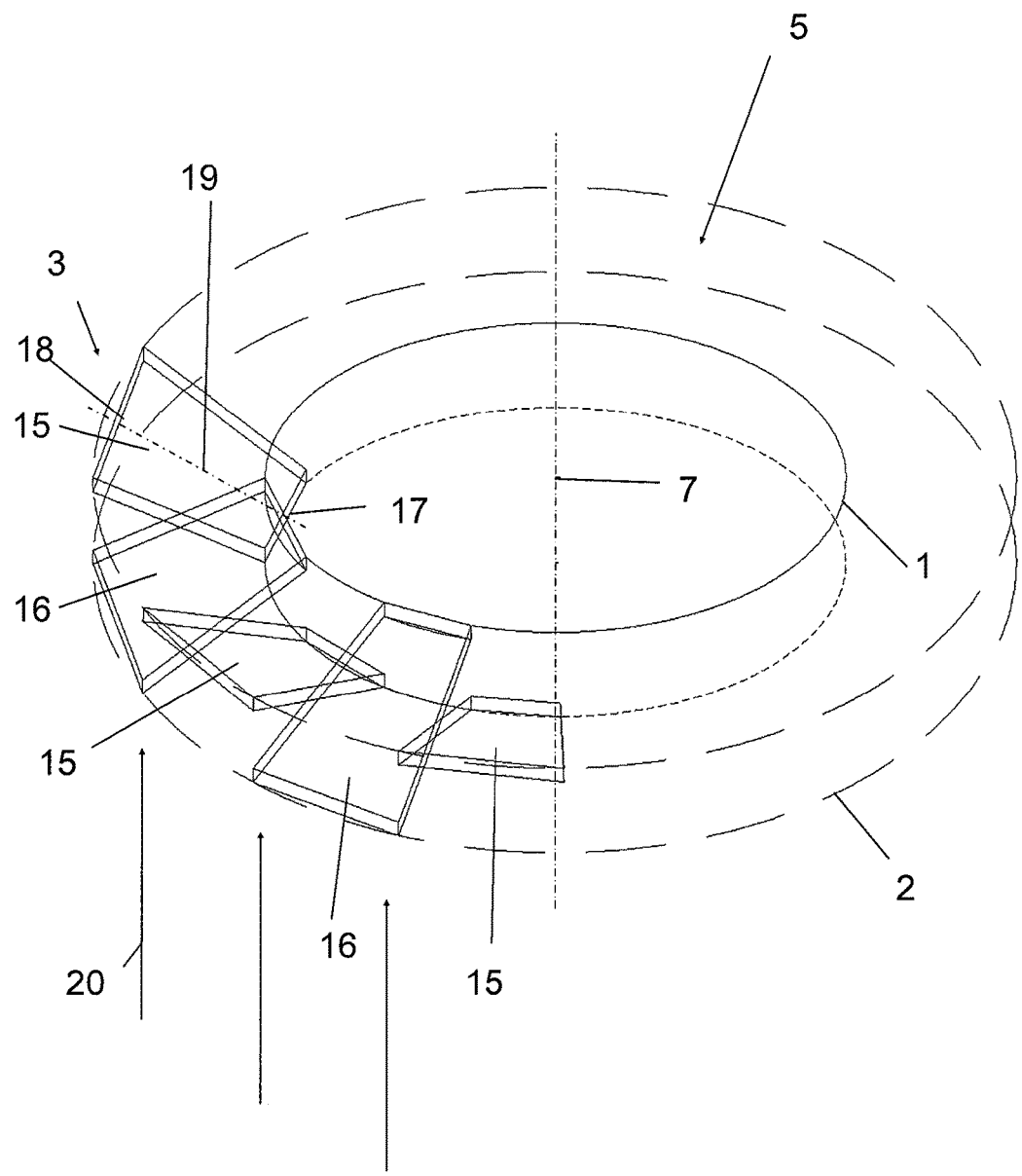

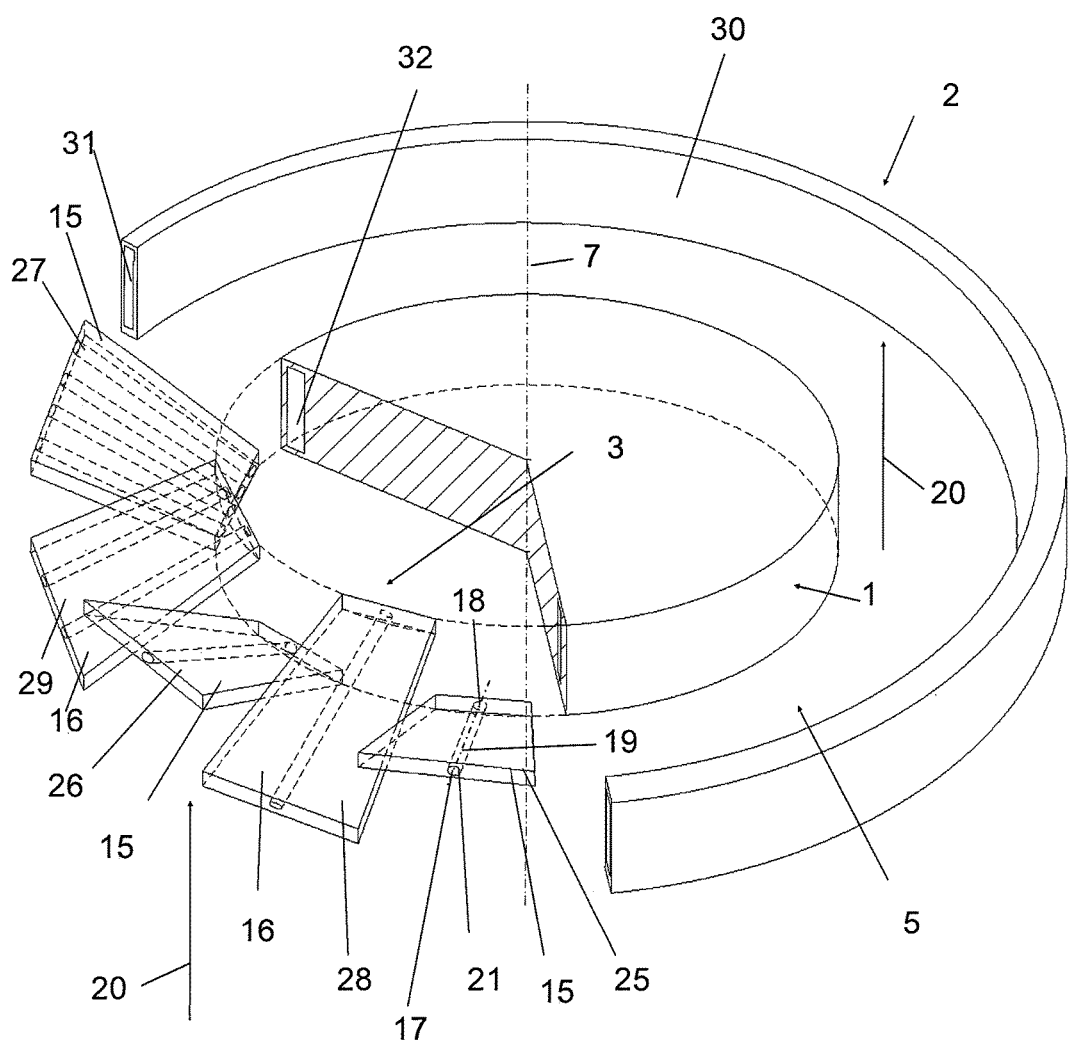

METHOD AND DEVICE FOR THE MANUFACTURE OF ANNULAR EXTRUDATES

Figure 1A:
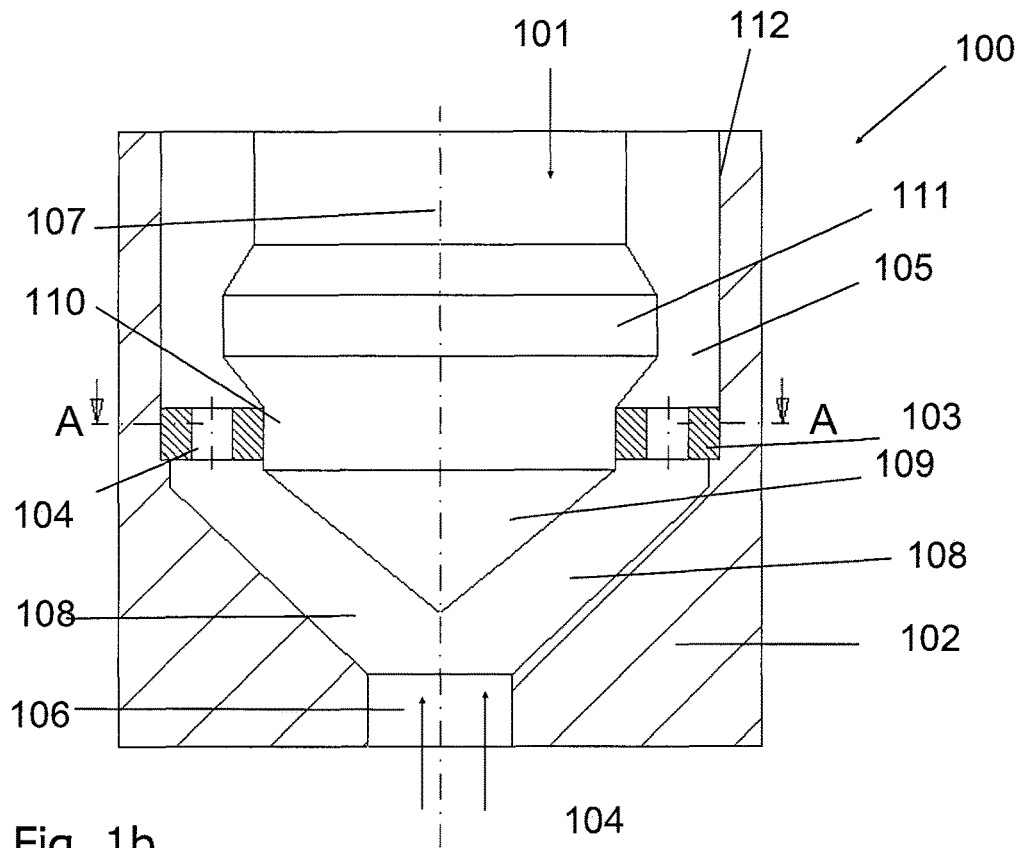

The invention relates to a device and a method for the manufacture of annular extrudates, in particular extrudates made from polymeric material, for example low density polymeric foams. A polymeric material can be supplied to an extrusion plant as a raw material as shown for instance in the document EP 2 103 411 A1 for the manufacture of foamed PET extrudates or in the document U.S. Pat. No. 4,746,477 A for the manufacture of a partially foamed polymer extrudate. The polymeric material is molten in the extruder, whereby a strand of molten polymeric material is created. Usually, the strand has the shape of a filled cylinder or a bar-shaped body. This strand can be transformed by a crosshead into a strand with an annular cross-section, whereby the crosshead is shaped as a conical element. The crosshead is disposed with a core which extends into the strand. The melt flow flows around this core and enters an annular gap, whereby the strand is transformed into a strand with an annular cross-section. This strand of annular cross-section leaves the crosshead through an annular gap at its end and forms an annular extrudate. The annular extrudate can be transformed further or can be cooled and solidified. The term annular extrudates comprises extrudates of a surface of any shape, such as round, tubular, oval, rectangular.

In the prior art, a number of devices and methods is known for which different supporting systems for crossheads or flow redirecting elements are foreseen. According to FIG. 1a and FIG. 1b a web holder or a hole plate crosshead holder is shown. Furthermore, helical distributors are known and shown in FIG. 2a or FIG. 2b, alternatively sieve basket holders as shown in FIG. 3a, 3b or barrel holders, as shown FIG. 4a, 4b or also known from the document U.S. Pat. No. 4,574,067 A1.

FR 2 257 411 A1 shows an extruder with an annular gap. To avoid errors on the surface of the foil made from polymeric material, the polymeric material melt is guided helically in the annular gap, whereby a homogenization of the flow profile is to be achieved.

However it can't be avoided that the flow velocity in a region close to the wall of the annular gap is lower than in a central portion of the annular gap.

However, it has shown, that these known devices and methods do not allow always to obtain a satisfactory constant extrudate melt quality, in particular if foamed extrudates are manufactured.

For this reason, it is for example suggested in document DE2621770 A1 an extruder injection or blow head for the manufacture of hollow profiles comprising a crosshead, which is held by web elements in the annular space in the nozzle and which additionally comprises a number of annular redirection elements arranged in series in the direction of flow downstream of the web elements. These redirection elements are formed as cylindrical or conical annuli, which carry vanes wound around axes parallel to the direction of flow. All of the vanes are wound in the same direction of rotation, wherefrom follows that the flow is redirected in a screw-like manner, what is also obtained in a similar way by the helical distributors according to FIG. 2a or by the distributor channel according to FIG. 4a which had not been proven to be an ideal solution for this reason. The document DE2461340 A1 also shows a redirecting device, by which the flow is redirected about an angle of 180°, which increases homogeneity of the melt flowing in the annular gap and should in particular result in a temperature equalization in the melt flow so to compensate for differences in the wall thickness of the annular extrudate. However, the redirecting device of DE2461340 A1 also results in a spiral flow, which can equalize temperature variations specifically existing in an arrangement of two injection heads with two discharge nozzles. These temperature variations result in different melt temperatures across different portions of the annular cross-section of the annular gap. However, no statement is made how to deal with temperature variations in the melt flow which exist across the width of the annulus, e.g. because the core flow has a different temperature with respect to the boundary flow. The core flow and boundary flow remain substantially intact due to the limited mixing effect of the spiral shaped redirecting device, therefore a temperature equalization across the width of the annulus can't be obtained with a device according to DE2461340 A1.

Products having a good foam quality are foam products which have a high tear strength or a high pressure strength, low densities or high insulating values. Any of these parameters are influenced by the cellular structure of the foam product. In many cases a narrow cell size distribution, the smallest possible cell sizes as well as the maximum number of cells in a given volume are important for a good foam quality. In addition, a uniform cell structure should be obtained over time as well as over the entire product cross-section.

Thus any of the known support systems and redirecting elements are not ideal for a homogeneous distribution of a strand of a viscous polymer melt onto an annular cross-section for the reasons listed in the subsequent detailed description.

Polymer melts are processed at processing temperatures ranging from 80 to 300 degrees Celsius and have a high viscosity of more than 1000 Pas. For such polymer melts any temperature variations present at the inlet of the device may only insufficiently equalized, even if a heating of the external and/or internal portion of the device takes place, in particular a heating of the jacket or the crosshead. The existing support systems, in particular web, hole plate or sieve basket support systems, disturb the even flow of the mass and lead to residence time variations and variations in fluid flow velocities.

Spiral mandrel distributors, sieve basket support elements, sleeve supports in many cases create a very high pressure drop. The flow characteristics in particular of spiral mandrel distributors and sleeve supports depends on the process conditions such as flow rate and temperature and the rheological characteristics of the mass. They would need to be adapted for each operating point which is not feasible in practice. Temperature variation, that means, an inhomogeneous temperature distribution along the flow cross-section as well as different residence times as well as variable flow velocities are often a reason for quality problems, such as variable wall thickness, inhomogeneous optical aspects of the surface of an inhomogeneous degree of foaming as well as inhomogeneous cell structure for foamed products.

In addition, variable temperature distributions and residence times may lead to a destruction of the polymer melt.

From the document EP 0 850 745 A1 a flow forming organ is known, by means of which an inhomogeneous flow profile of a polymer melt can be equalized. However the organ of EP 0 850 745 A1 has been developed with the principle to avoid a degradation of the polymer melt in boundary regions. A plurality of static mixers is attached to a movable bar element and the mixers can be moved together with the bar element in the stationary jacket. This means that the static mixers oscillate in the jacket, whereby an intensive mixing effect occurs at or close to the inner wall of the jacket. For this reason the static mixers can't be attached to the inner wall of the jacket and for this reason the static mixers can't assume any support function for a mandrel and are therefore unsuitable as support system.

In addition uneven temperature and residence time distributions can lead to the decomposition of the polymer melt. Due to the fact that holding elements represent locations of flow disturbance, the passages leading to the annular gap have to be of sufficient length for discharging the polymer melt from the device.

Therefore there is a need for a solution according to which a homogeneous melt flow in the annular gap is obtainable. An object of the invention is to optimize a device and a method for the manufacture of an annular extrudate, to obtain a uniform extrudate quality, that means in particular an extrudeat of homogeneous physical properties, which result in improved mechanical properties, such as strength, ductility or dimensional stability. The uniform extrudate quality should in particular be reached anytime independently of the process conditions and independently of the extruded polymer material.

Therefore a device and a method for the manufacture of annular extrudates shall be proposed, by which a polymer melt of mostly uniform temperature and uniform velocity as well as low pressure drop is distributed onto the annular cross-section. The device should be configured as short and compact as possible such that for different operating points and polymer melts of differing composition a uniform temperature distribution as well as a substantially equal flow velocity over the circumference of the annular gap as well as over the gap width can be obtained.

The problem is solved by a device according to claim 1 as well as a method according to claim 9. Advantageous embodiments of the device are subject of the dependent claims 2 to 8. Advantageous method variants are subject of claims 10 to 15.

A device for the manufacture of an annular extrudate comprises at least one stationary jacket and at least one stationary crosshead arranged inside of the jacket. A polymer can be molten in an extruder to a polymer melt. The polymer melt can enter a melt passage after having left the extruder. This melt passage can form a supply passage for the polymer melt of the device. The jacket contains a melt passage, whereby the crosshead is arranged in the melt passage, such that the melt passage extends at least at the outlet of the device as an annular melt passage around the crosshead. An annular passage is formed between the crosshead and the jacket. The annular passage contains a static mixer, whereby the crosshead is at least partially supported by the static mixer in the jacket.

In particular, at least 20% of the forces of the polymer melt acting onto the crosshead can be introduced into the jacket via the static mixer. In the following, these forces are referred to as supporting forces, due to the fact that they help to support the crosshead in the jacket. That means at least 20% of the supporting forces are absorbed by the static mixer. According to an embodiment, at least 30% of the supporting forces can be absorbed by the static mixer. Thereby at least a portion of the supports usually required for fixing the crosshead in the jacket, which are arranged in the flow path, can be at least partially dispensed with. According to an embodiment, at least 40%, in particular more than 60%, of the supporting forces can be absorbed by the static mixer. According to these embodiments, a further stabilization of the crosshead in the jacket can be obtained in addition to a further reduction of the number or the cross-sectional area of the supporting elements. The static mixers can be arranged downstream of the conical distributor, advantageously at least partially near the end of the crosshead which is situated oppositely to the conical distributor, such that the crosshead can be supported in a stable manner in the annular passage.

If the crosshead is attached to conventional supporting elements, these have to be placed as distantly as possible from the discharge end of the melt from the device. Furthermore, there is a requirement to the supporting elements, that they should influence the flow as little as possible, what can be achieved by locating the supporting elements as far as possible from the discharge end of the jacket. The supporting elements are of a delicate construction to influence the melt flow as little as possible such that the melt flow is calmed before the discharge end. This requirement leads in the prior art solutions to an instable connection between the crosshead and the jacket which can result in a dislocation of the crosshead with respect to the jacket.

That means that by these measures, contrary to the crossheads according to the prior art, not only an improved mixing of the polymer melt may result, but also the width dimension of the polymer melt is kept constant in a narrow tolerance range, due to the fact that a centering of the crosshead can be obtained by the mixer in particular at the discharge end. For this reason, surprisingly, a significantly higher dimensional stability of the polymer melt can be obtained and a significantly higher product quality can be reached. In addition, the device can build more compactly and at a reduced cost.

According to a particularly preferred embodiment, the supporting elements can be substituted entirely by static mixers. Accordingly, a supporting element, an insert or a support element for the crosshead can be dispensed with. The static mixer is configured such, that the crosshead can be fixed inside the jacket, whereby the displacement of the crosshead relative to the jacket is excluded. The static mixer can comprise a plurality of inserts, whereby at least a portion of the inserts is connected to the crosshead and/or the jacket. According to an embodiment, the static mixer is disposed with a rotational symmetrical arrangement of inserts around the central axis.

In particular, a portion of the inserts can be arranged in angle with respect to the direction of flow, whereby the angle is more than 0 degrees.

According to an embodiment, the inserts can have a length, a width and a thickness, whereby the length of the inserts is greater than the normal distance between the inner wall of the jacket and the outer wall of the crosshead.

The width on inserts can be less than the normal distance between the inner wall of the jacket and the outer wall of the crosshead. In particular, the width of the inserts can be less than half of the normal distance between the inner wall of the jacket and the outer wall of the crosshead. Particularly preferred, the width of the inserts can be less than half of the normal distance between the inner wall of the jacket and the outer wall of the crosshead.

According to an embodiment the inserts can comprise annular, tubular, bar shaped or planar, for instance wing-shaped, web elements.

According to an embodiment, the web element has web width and a web thickness, whereby the web length and the web thickness are measured in a plane, which is substantially normal to the longitudinal axis of the web. In an example, the web thickness roughly corresponds to the web width. The web thickness and the web width can also decrease within the static mixer or vary between neighboring static mixers and can in particular decrease when viewed in the direction of flow.

According to an embodiment, at least a portion of the inserts can be configured as web elements, whereby at least a portion of the web elements can form a group, whereby the web elements each can have a central axis, whereby the central axis of the web elements belonging to the group can form a substantially constant angle to the central axis of the mixer.

According to an embodiment, the inserts can comprise a first group of web elements as well as a second group of web elements, whereby the first group of web elements extends along a first common group plane and the second group of web elements extends along a second common group plane, whereby the first group is arranged crosswise to the second group. In particular the supporting system for the crosshead can consist of crosswise arranged webs, which are arranged in a circular segment in the annular passage and/or in the supply passage. At least a portion of the webs can be arranged in an angle not equal to zero degrees in respect to the direction of flow an can extend from the inner wall of the jacket to the outer wall of the crosshead. In particular the group planes can be formed by the central axis of the web elements or tubular elements belonging to the corresponding group.

At least a portion of the inserts, in particular the web elements, can comprise passages, whereby the passages extend from a first end of the web element to a second end of the web element, whereby the jacket comprises a corresponding passage, which is in fluid connection with the first end and the second end of the web element. Such a fluid connection can be provided by the passages through which for example a liquid, a gas, a melt, in particular another polymer melt may pass or a fluid which can contain also solids. Alternatively, a cable can be drawn or pushed through the passages. These passages form channels inside the inserts of the static mixer.

The annular passage can comprise a plurality of static mixers, which are arranged in series in the direction of flow. According to an embodiment, the annular passage can comprise a first static mixer and a second static mixer, whereby the first static mixer is arranged at a distance to the second static mixer.

According to an embodiment, static mixers can be arranged in the conical transition area. The conical transition area is found at the supply side of the crosshead, that means in the location, at which the polymer melt enters the annular passage between the crosshead and the jacket. Prior to the entry into the conical transition area, the flow forms a tubular flow, whereas in the conical transition area and the subsequent annular passage, an annular flow is formed. For this reason a static mixer can be arranged also in the transition region transforming the tubular flow into the annular flow.

According to an embodiment, the distance between the jacket and the crosshead can be enlarged or decreased in the location of the static mixer. The cross-sectional area of the annular passage can increase or decrease along the central axis. The inner diameter and/or the outer diameter of the annular passage can change in the direction of flow.

In particular the static mixer or each static mixer can contain a plurality of inserts. The inserts can be configured according to any one of the preceding embodiments.

In particular, groups of web elements can be foreseen, whereby a first group of web elements is rotated about the central axis of the annular passage about an acute angle relative to a second group of web elements. According to an embodiment, a static mixer can comprise a plurality of first and second groups of web elements. Each of the group of web elements can comprise a plurality web elements. The web elements of a web element group are advantageously arranged substantially parallel to each other. The web elements can be linearly shaped or can be curved. The cross-section of the web elements can in particular be rectangular. According to an embodiment, a plurality of first groups of web elements and second groups of web elements can extend substantially parallel to the inner wall of the jacket and the outer wall of the crosshead. The web elements of each of the first and second web element groups are arranged cross-wise to each other. The web elements include an acute angle with the main direction of flow, which is substantially parallel to the longitudinal axis.

A distance can be foreseen between neighboring groups of web elements, which is free from inserts, such that each of the groups of web elements forms a static mixer of its own.

Different types of inserts and different static mixers can be combined, that means they can be arranged in relation to the main direction of flow in, in parallel or in series.

All inserts have in common, that they are of a construction allowing to transmit the forces from the inner part, i.e. the crosshead to the outer part, i.e. the jacket. For this reason it is required that the supporting elements are constituted as stiffly as possible. The connection and transmission of forces is effectuated from the inner part to the outer part mostly through the cross-wise arranged inserts of the static mixer. According to a variant, the supply of polymer melt can be effectuated in a reverse manner, that means, the polymer melt can be deflected in the jacket or in the crosshead.

The crosshead comprises according to an embodiment a centrally arranged cone around which the polymer melt is guided and consequently expanded. The inserts can be configured as a plurality of web elements arranged parallel to each other. The web elements can be curved, such that parallel web elements have the same curvature but not necessarily the same length. At least a portion of the web elements can form a group, whereby each of the web elements has a central axis, whereby the central axes of the web elements belonging to the group include a substantially constant angle with the central axis of the mixer, whereby the angle in particular is about 90 degrees. The web elements can be configured at least partially as lateral web elements. According to a further embodiment, the static mixer can comprise inserts which are arranged in a plurality of annular segments. For heating, cooling or control purposes, at least a portion of the inserts can comprise hollow spaces for a heat exchange fluid, for cables, for heating elements, for resistance heating elements etc.

As a consequence of the temperature homogenization in the melt, the construction length of the device can be decreased. In particular, the distance between the last static mixer in the direction of flow to the discharge end of the device can be at most 30 cm, particularly preferred a at most 20 cm.

Under an annular extrudate, any arbitrary shape may be understood which encloses a core of any shape. The core can include any material from the group of gases, liquids or solid bodies. The solid body can in particular comprise an element from the group of polymers or metals. The polymers can have the same or different composition. The annular extrudate leaving the device can be processed further to form a tube, or can be reshaped to form a bottle or can be cut laterally to form a foil or by introducing a core to form a cable. Alternatively, an extrudate without core can be manufactured, for example a decorative profile shape. For this reason, the geometry of the flow passage downstream of the device can be configured in any arbitrary manner.

According to a variant of the method, a fluid or a gas can be added before or in the device, whereby the fluid or the gas can contain at least one element from the group of additives, coloring agents or blowing agents.

According to a variant of the method, a plurality of annular extrudates can be manufactured as superposed layers.

According to a variant of the method, the extrudate can foam and can be processed to a foamed product. In particular, the device and the method according to any one of the preceding embodiments can be used for the manufacture of foamed annular extrudates whereby in particular polymer foams of a low density can be processed. Under foams of a low density, foams of a density of less than 500 kg/m$^3$ are intended.

According to a variant of the method, the polymer is molten in a first extruder, thereafter the polymer melt is led through a static mixer, by which the temperature of the melt is homogenized over the entire cross-section and which can be cooled or heated at the same time to obtain an exact melt temperature thereby. Thereafter the temperature stabilized cooled polymer melt can be supplied to the device. In particular the temperature stabilized cooled polymer melt can enter a melt passage after having left the extruder. This melt passage can serve as a supply passage for the polymer melt to the device. The jacket element contains a melt passage, whereby the crosshead is arranged in the melt passage, such that the melt passage extends at least at the discharge end of the device annularly around the crosshead. An annular passage is formed between the crosshead and the jacket. The jacket contains a static mixer, whereby the crosshead is supported at least partially by the static mixer in the jacket. Advantageously at least 20%, preferably at least 30%, more preferred at least 40%, in particular more than 60% of the support forces are absorbed by the static mixer. The annular polymer melt can be discharged for instance through a die after having been discharged from the device, such that subsequently to the die, a foamed annular polymer melt is obtainable. By way of the method according to the invention, foamed polymer extrudates with increased heat insulating capacity and/or reduced foam density are obtainable.

According to an embodiment, the method for manufacturing an annular foamed extrudate comprises the following steps: a polymer is molten in an extruder to form a polymer melt. The polymer melt enters a melt passage after having been discharged from the extruder, in which a stationary jacket is arranged. A stationary crosshead is arranged in the melt passage, whereby the polymer melt flows around the crosshead, such that an annular melt flow is generated by the crosshead. An annular passage is formed between the crosshead and the jacket. The annular passage contains a static mixer whereby the crosshead is at least partially supported by the static mixer in the jacket. The static mixer comprises a plurality of inserts, whereby at least a portion of the inserts is connected to the crosshead or the jacket. In particular, the static mixer can have a tempering element, by means of which the melt temperature can be homogenized over the entire cross-section, whereby the static mixer can be cooled or heated to obtain a temperature stabilized cooled melt, whereby the temperature stabilized melt is discharged subsequently by a die element.

According to an embodiment, a blowing agent is added to the polymer melt, such that a polymer melt containing the blowing agent is obtained, which is supplied to a second extruder, whereby the polymer melt containing the blowing agent is cooled in the second extruder.

According to any of the preceding embodiments, the static mixer can comprise inserts, which interact with the melt and by which the melt can be cooled or heated. In particular, the melt can be led through a static mixer prior to entering the annular passage. That means, this static mixer is arranged upstream of the annular passage, whereby upstream refers to the direction of flow of the polymer melt.

According to an embodiment, a temperature equalization can be obtained in the annular passage, whereby the melt is led through one of a dynamic mixer, a static mixer, a heat exchanger or a transfer conduit, which can be configured in particular as a heatable or coolable tube element, or by any combination of at least two of the previously named devices, before the polymer melt enters the annular passage or during flow through the annular passage. In particular a device according to any of the preceding embodiments is used for the manufacture of a foamed annular extrudate. The static mixer can be configured such that the mixing elements are configured to be also supporting elements.

Advantageously the lowest and highest temperature in the melt cross-section after the static mixer differ less than 5 degrees Celsius, preferably less than 3 degrees Celsius, most preferred less than 1.5 degrees Celsius from each other.

In a second stage of the extruder a gaseous or liquid blowing agent can be added and dissolved. Thereafter the polymer melt containing the blowing agent is guided into an annular passage, whereby the melt is mixed and/or cooled prior to or in the annular passage. The melt leaving the extruder is guided advantageously trough a static mixer. Such a static mixer can be configured as an annular hollow body with an inner space containing fixed inserts. The annular hollow body may have a circular or polygonal cross-section, if arranged upstream of the generation unit of the annular passage and can have a shape corresponding to the annular passage, if arranged in the annular passage or annular gap. By way of the inserts, the flow is disturbed, which leads to a trough-mixing effect. Usually the melt enters the static mixer with a temperature gradient. The core temperature of the melt doesn't correspond to the wall temperature at the inner wall of the annular hollow body. The temperature is equalized over the entire cross-section by mixing processes in the inner space of the static mixer.

The melt in the annular passage may discharge into an annular die, such that the melt can be discharged through the annular die. If the melt is configured as a foamable polymer melt, the melt foams at the discharge end of the die or subsequently to the discharge end of the die. Thereafter the extrudate is cooled until its solidification.

In particular a blowing agent can be added to the polymer melt, such that a polymer melt containing the blowing agent is obtained. This polymer melt containing the blowing agent, can for instance, as described in EP2865503 A1, be supplied to a second extruder. The polymer melt containing the blowing agent can be cooled in the second extruder. After having been discharged from the second extruder, the melt can be directed through a static mixer. In particular, a static mixer can be chosen, by which the temperature of the melt can be homogenized over the entire cross-section. According to an embodiment, the static mixer can be cooled and/or heated, such that a temperature stabilized cooled melt is obtainable. The temperature stabilized cooled melt can be discharged by a die element. A temperature stabilized cooled melt is intended to be a melt which has a uniform temperature measured across the melt cross-section.

The blowing agent can be dissolved in the melt by mixing and dispersing processes in the first extruder and/or a static mixer and/or a transfer conduit between the first and second extruder and/or in the second extruder.

It has been shown, that for obtaining a good foam quality, an exact temperature control is required in addition to the temperature homogenization of the melt upstream of the die. In addition, the melt temperature, that is the temperature of the melt for reaching very low foam densities, has to be also kept very low. The static mixers used after the extruder according to the prior art can be used to equalize the temperature inhomogenities, which are typically present after the second extruder. However, the static mixers are only suitable to a limited extent for influencing the temperature, as they can't be used for efficient cooling or heating. In addition, the use of static mixers can result in an increased melt temperature depending on the type of the mixer because of the pressure drop in the mixer. An increased back pressure is exerted onto the second extruder and is compensated by a corresponding higher friction in the extruder. The friction causes a generation of heat, which results in an increased melt temperature. An increased melt temperature is in many cases undesirable as low foam densities may not be obtained as a consequence. Under a low foam density, a density of the foam of less than 50%, preferably less than 20%, most preferred less than 10% as compared to an unfoamed polymer melt is intended.

An exact temperature control at the discharge end of the second extruder is in many cases difficult, because the melt has to be cooled in the second extruder with high directing temperature differences of about 20 degrees up to and including more than 80 degrees Celsius. Accordingly, the control of the discharge temperature in a range of plus/minus 1 to 4 degrees Celsius is very difficult. In addition, it has to be taken into account that the melt temperature at the discharge end of the second extruder is in many cases very inhomogeneous over its cross-section. The temperature differences between a boundary zone of the polymer melt and a central area can be up to 30 degrees Celsius. Under a central area, an area is intended, which corresponds to a rotational symmetrical body, which is arranged around the central axis of the extruder and which extends to up to a third of the distance between the central axis and the inner wall of the extruder or the static mixer.

In addition, a change of the temperature profile over time can result from a process change due to for instance the build-up of deposits in the second extruder or a quality change of the polymer raw material used. The temperature changes due to the static mixers or the periodical temperature changes resulting from different process conditions can't be compensated by a method according to the prior art, what in many cases leads to inferior or variable foam qualities.

The static mixer can be cooled or heated contemporaneously by a heat exchange medium to obtain a melt with optimal processing temperature. The tempering can for instance be obtained by a double jacket through which a heat exchange medium passes. For instance, liquids, such as water or oils, are suitable as a heat exchange medium. Other liquids or also gases, such as air, can be used as well. However, it has been shown that the tempering from the outside has a limited effect in particular if the flow rate of the melt is at least 50 kg/h due to the fact that the heat exchange surface is too small compared to the mixer volume. In case of such higher flow rates, the heat exchange medium is guided advantageously through at least a portion of the inserts of the static mixer which are in contact with the melt flow to increase the heat exchange surface. The inserts for the heat exchange fluid are advantageously arranged such that the melt is not divided in partial flows, but is mixed continuously as a whole over the entire cross-section. The insert elements can comprise one of annular, bar-shaped or surficial, for instance wing-shaped, web elements.

Advantageously, a temperature equalization or a precooling of the melt can be achieved between the first and second extruder, whereby the melt is guided through one of a dynamic mixer, a static mixer, a heat exchanger or a transfer conduit, which can in particular be configured as a heatable or coolable tube element, or any combination of at least two of the devices mentioned previously.

It has been shown that a static mixer is particularly suitable if comprising a first group of web elements as well as a second group of web elements, whereby the first group of web elements extends along a first common conical surface and the second group of web elements extends along a second common conical surface. The temperature can be equalized over the entire cross-section particularly well by such a static mixer. The contacting insert elements for the melt tempering can have any arbitrary shape, for instance web elements containing tubes or channels or passages, which are arranged parallel to the direction of flow or also inserts which are arranged in an angle to the direction of flow. The angle between the direction of flow and the central axis of the inserts can be an acute angle or the complementary obtuse angle. Under contacting insert elements, insert elements are intended which extend into the melt. Such an insert element is thus a body disturbing the flow which locally induces a change of flow direction of the melt.

One or more groups of web elements can be connected to the jacket. It has been shown that it is particularly advantageous to combine the contacting insert elements for the tempering of the melt with the inserts arranged in the static mixer. For example, at least two crosswise arranged groups of web elements or tube elements can be used, through which a heat exchange medium circulates. Alternatively, web elements can be foreseen which include hollow spaces for receiving cables or heating elements. The groups of web elements or tube elements arranged in a crosswise manner can be supported by a head plate and can be disassembled from the enveloping mixing tube. Very high heat exchange surfaces can be obtained by such static mixers. At least a portion of the web elements can comprise passages, whereby the passages extend from a first end of the web element to a second end of the web element, whereby the jacket contains a corresponding passage which is in fluid connection with the corresponding first end and the second end of the web element. Such temperable static mixers achieve a very good mixing effect and have a high cooling or heating power. Due to the fact that the static mixer is also used for the tempering, no additional inserts, such as tubes arranged parallel to the direction of flow are required, which could disturb the mixing process.

It has been shown that the use of a static mixer according to any of the preceding embodiments results in an improvement of the foam structure, whereby foams with very uniform cell structures of low, that means small, foam density and a narrow cell size distribution are obtainable. Due to the uniform cell structure, also the physical properties such as tear strength, tensile strength or the insulation capacity are improved. A set foam structure can be maintained over a considerable time period, due to the fact that variable temperature conditions can be equalized by the extruder.

In addition it has been shown, that it is advantageous to control the melt temperature with the heatable or coolable static mixer. Advantageously, the melt temperature downstream of the static mixer is measured for instance at its discharge end or in the annular die or is maintained by cooling or heating of the static mixer at an adjustable set temperature. Thereby a defined temperature can be maintained also by changing process conditions, whereby a constant foam quality is obtainable.

A substantially homogeneous temperature distribution over the cross-section of the melt has the advantage, that the cell size distribution over the entire cross-section of the extrudate is homogenized. Due to the small variation of the cell size in the cross-section a homogeneous cell construction results, which leads to a polymer article of defined characteristics. In particular, the medium cell size of a width section of 20% of the total width of the extruded foil or plate differs less than 20%, preferably less than 10% from the medium cell sizes of the other width sections. For the manufacture of annular extrudates, which are processed to products to be used for thermal insulation, the portion of open cells accounts for less than 15%, in particular less than 10%, most preferred less than 5% of the entire amount of the cells. For the manufacture of other annular extrudates, a predominantly constant portion of open cells of for example 40% up to and including 70% is desired. For such products the portion of open cells in a width section of 20% of the total width of the extruded foil or plate differs less than 20%, preferably less than 10% from the medium cell sizes of the other width sections.

The inventive method can be used for the manufacture of low density foams of any polymer, however it is particularly suitable for polystyrene, polypropylene, polyethylene, polyethylene terephthalate, poly vinyl chloride, polyacryl nitrile, polyamide, polyester, polyacrylate, polylactic acid (PLA) as well as other biopolymers or mixtures thereof. As a blowing agent, any liquid, gas or solid or mixture of blowing agents capable of forming a gas can be used. In particular, ethers, hydrocarbons, ketones, esters, water, carbon dioxide or nitrogen are suitable blowing agents.

In particular, the die element at the discharge end of the melt flow from the annular gap or annular passage can be shaped as an annular nozzle. A blowing agent can be added with a blowing agent supply device to at least one of the first or second extruders or the transfer conduit.

Figure 1B:
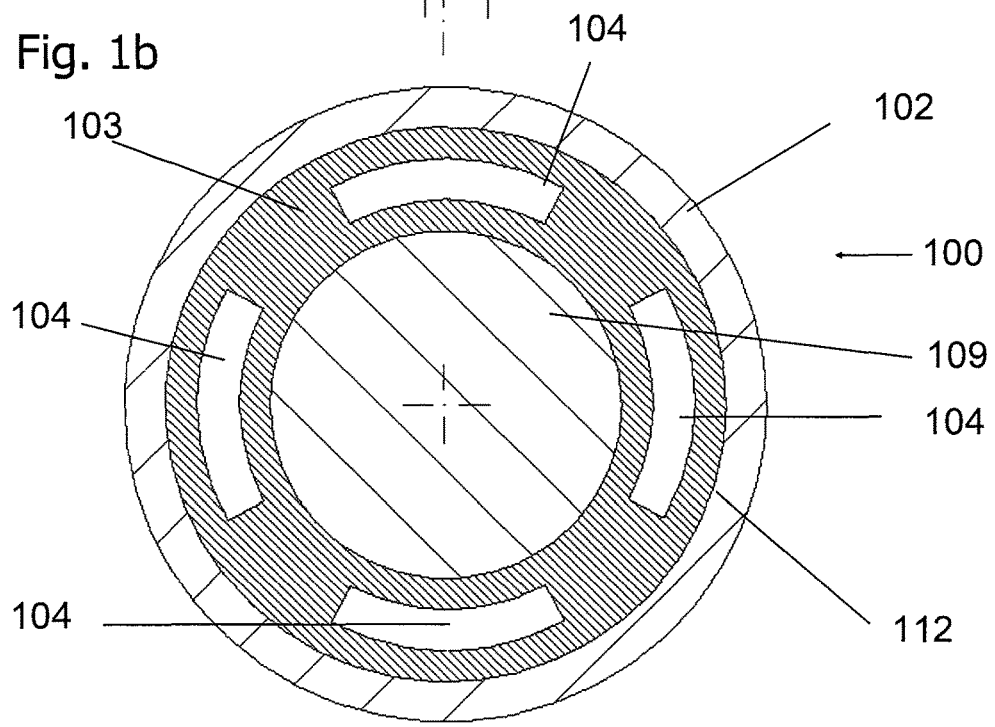
Figure 2A:
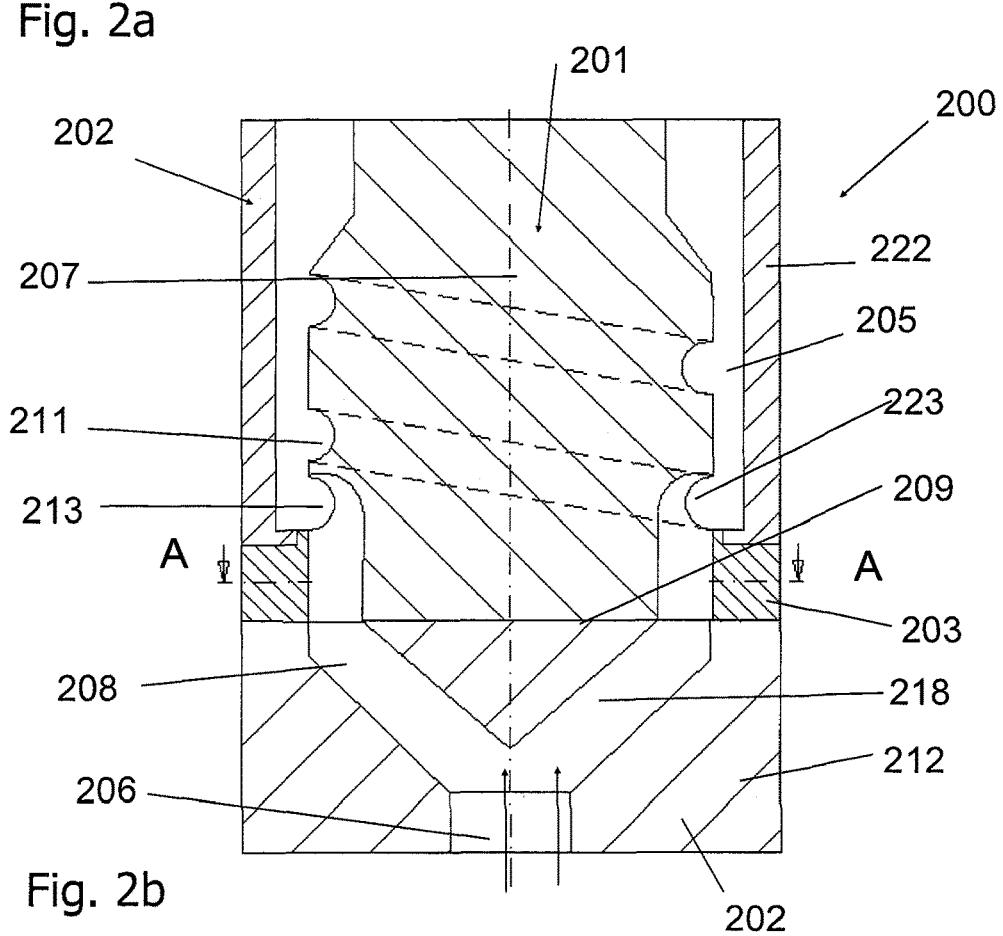
Figure 2B:
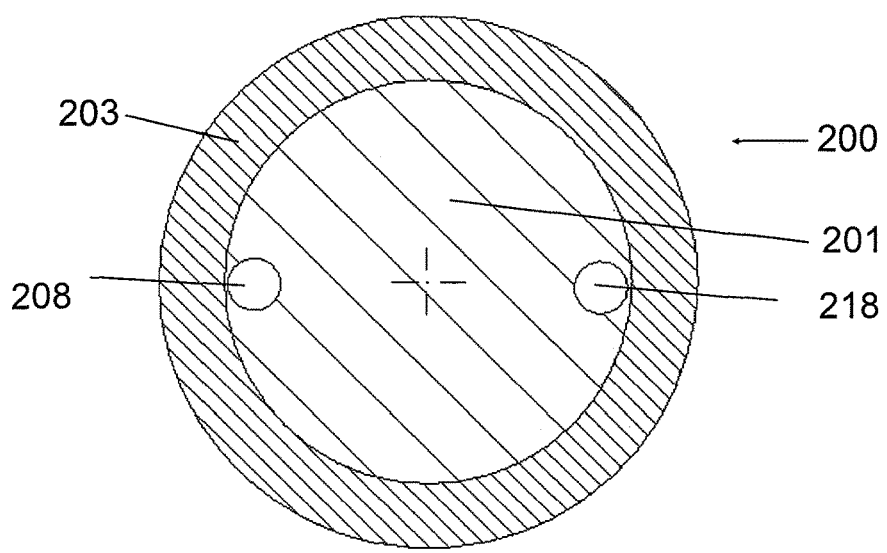
Figure 3A:
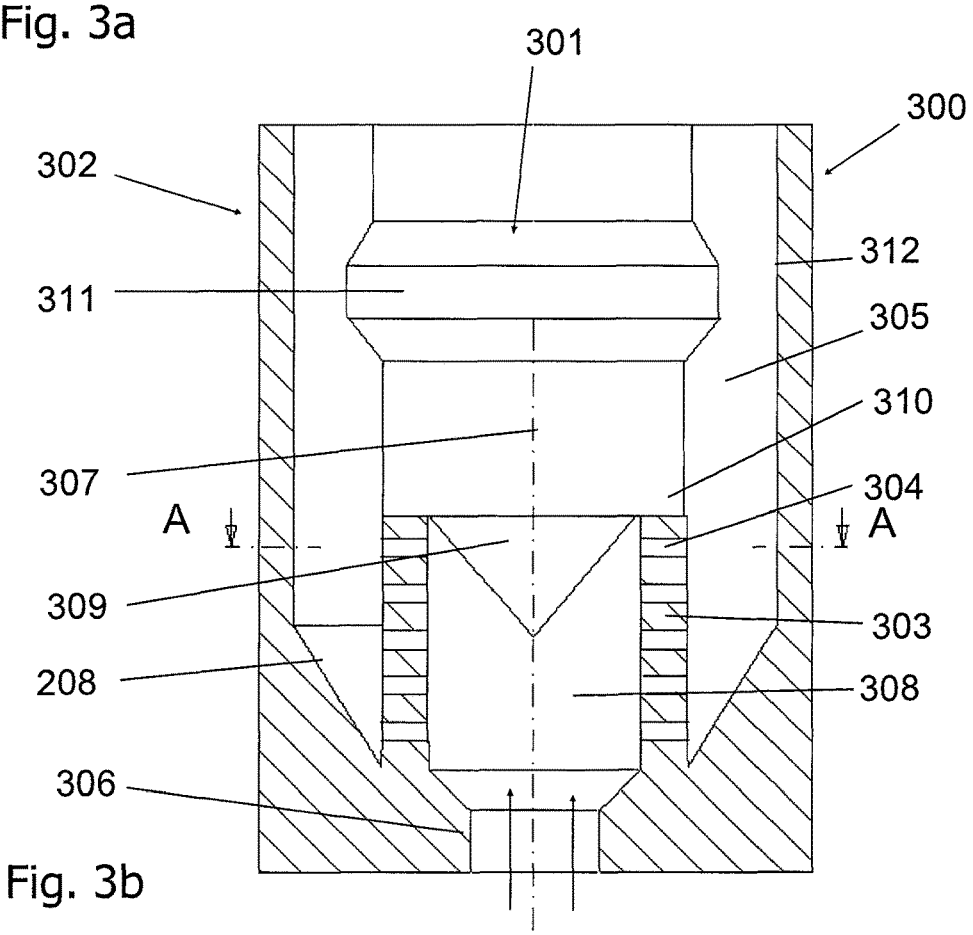
Figure 3B:
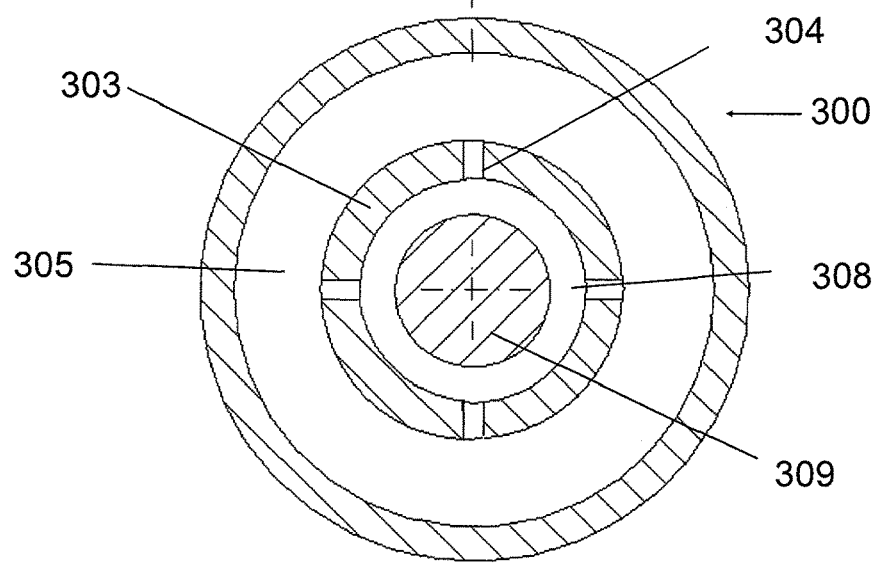
Figure 4A:
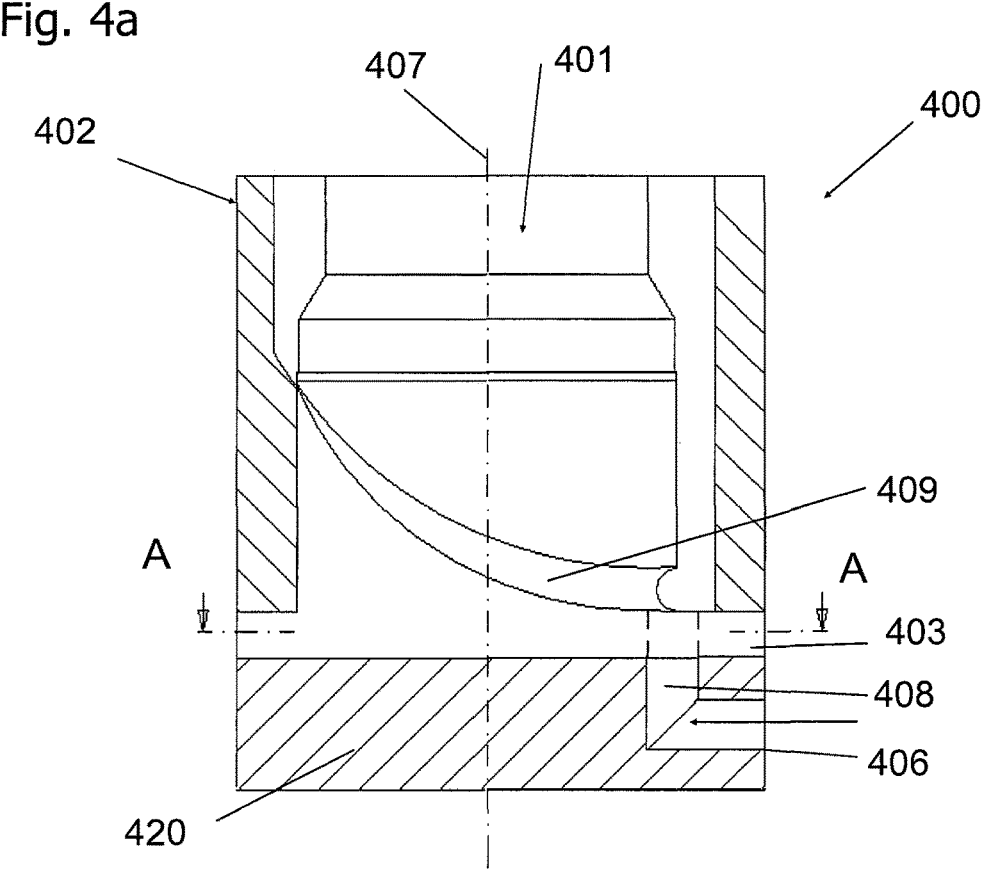
Figure 4B:
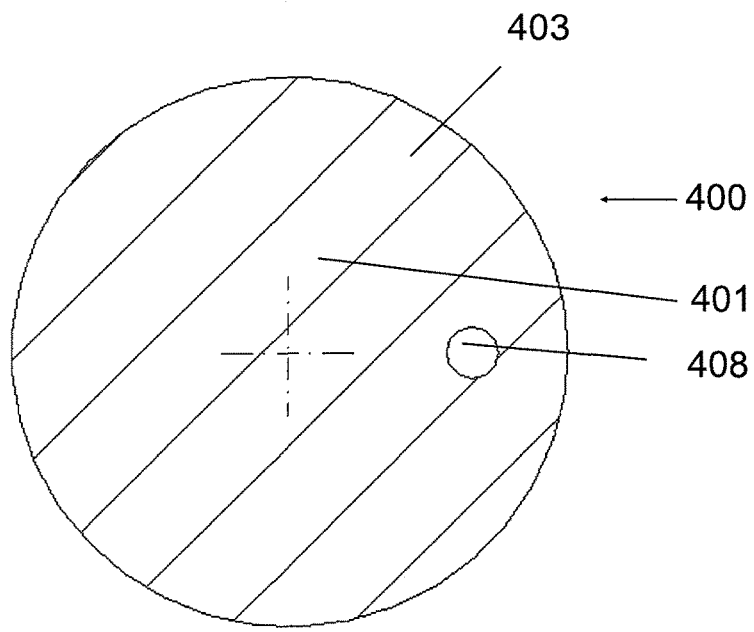
Figure 5A:
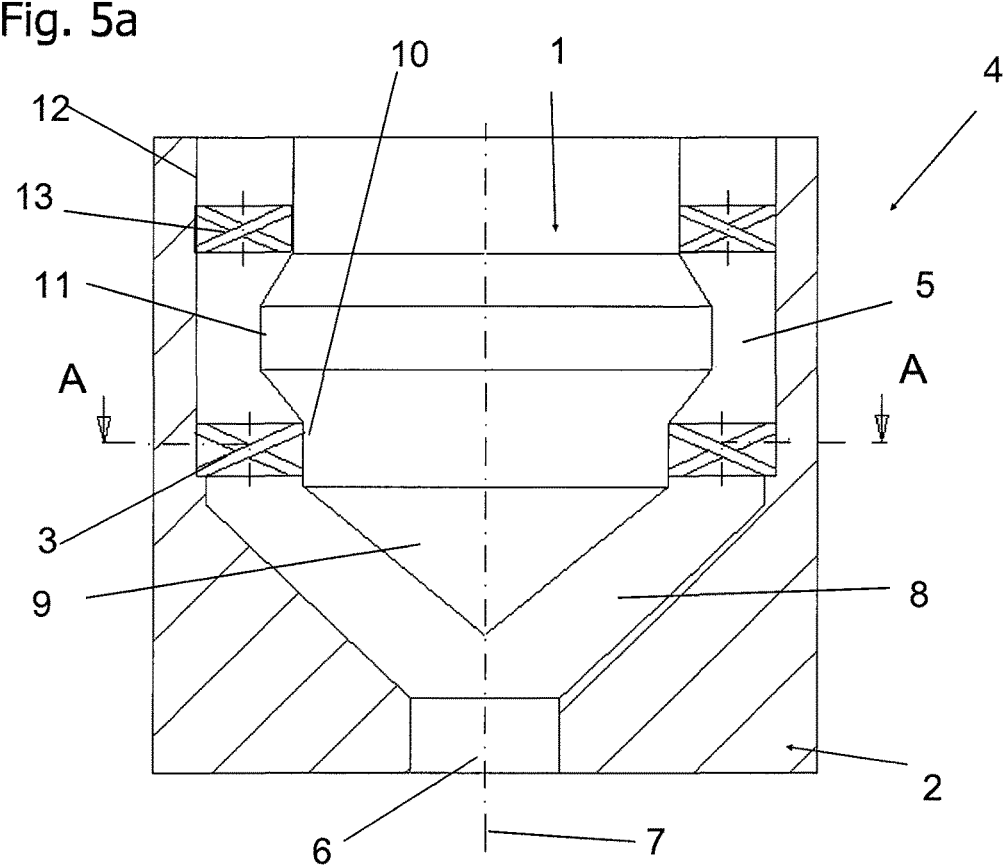
Figure 5B:
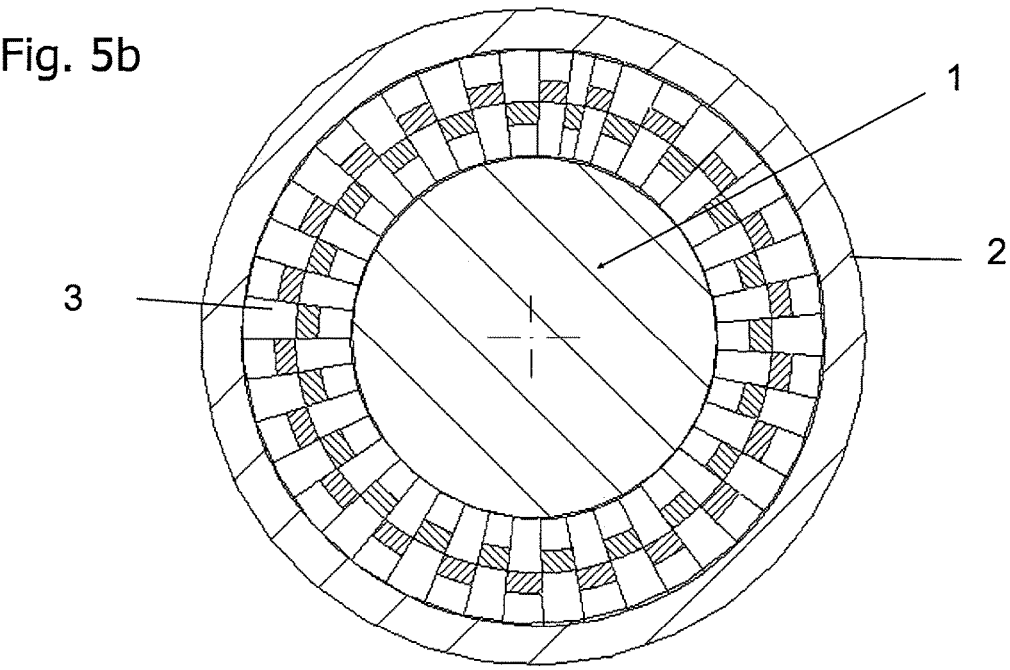
Figure 5C:
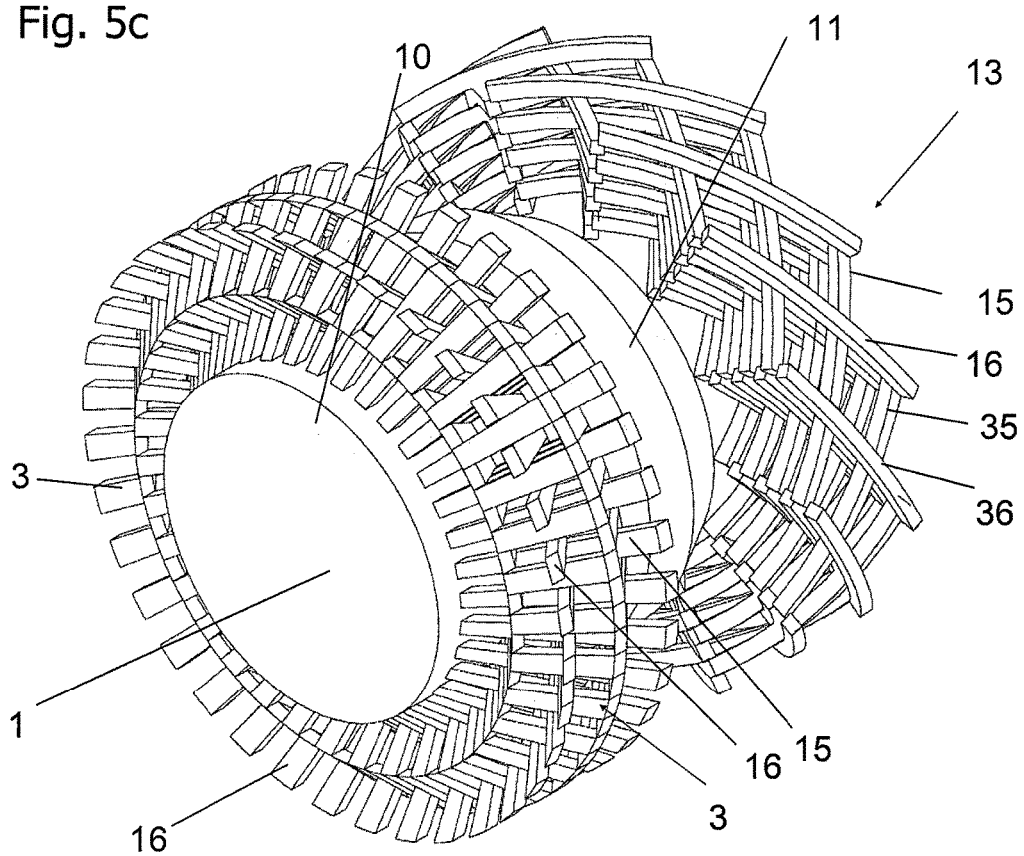
Figure 5D:
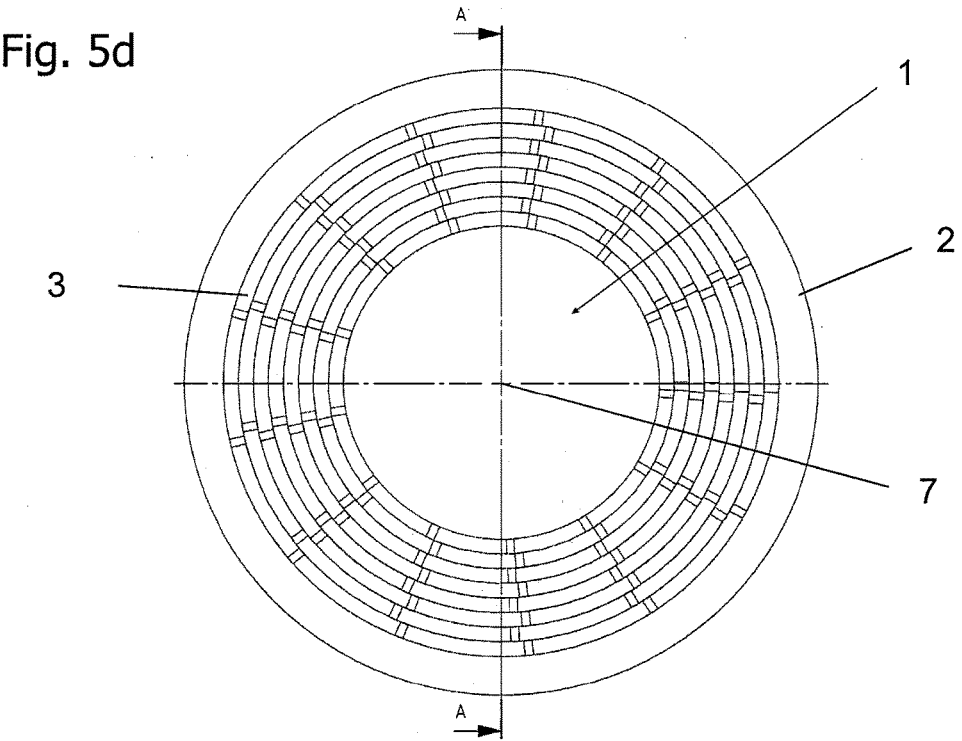
Figure 5E:
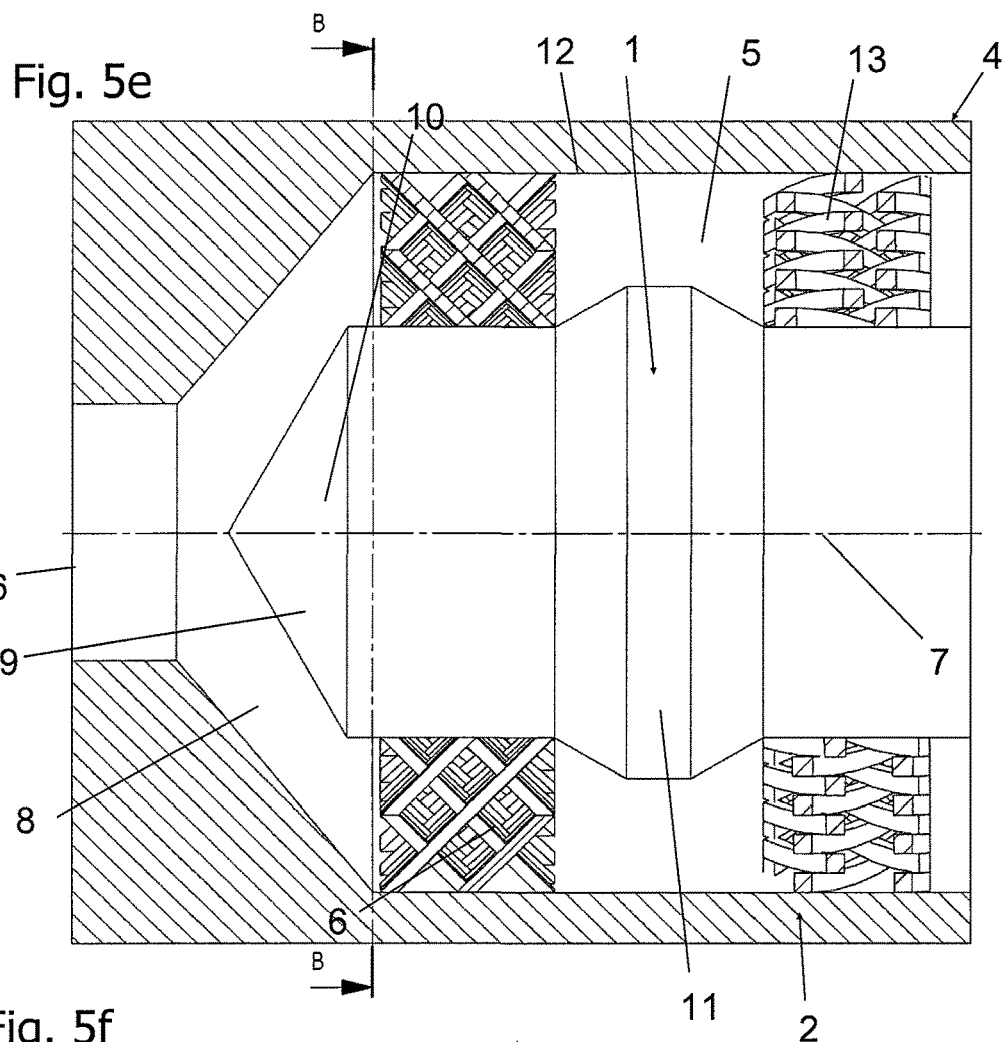
Figure 5F:
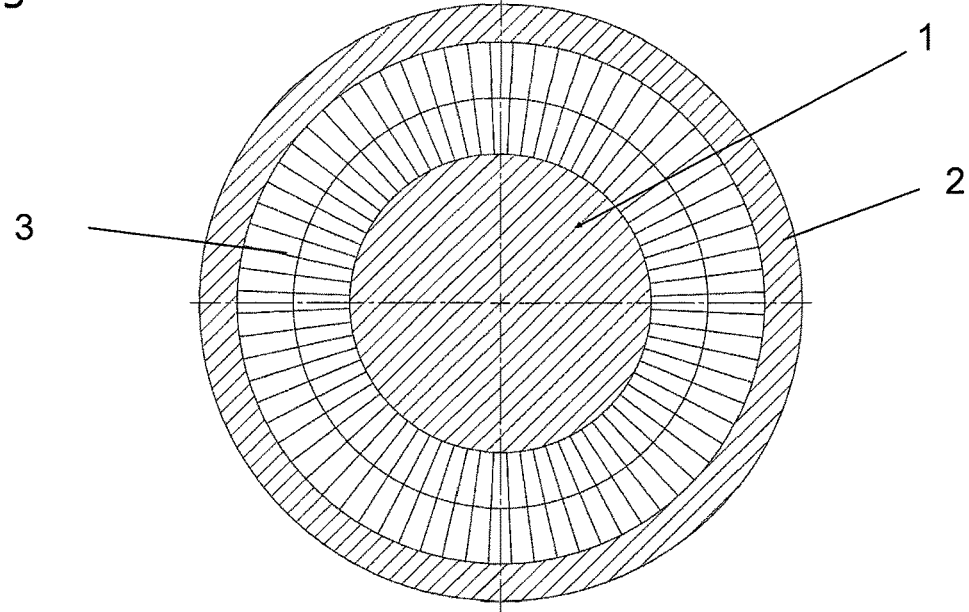
Figure 8:
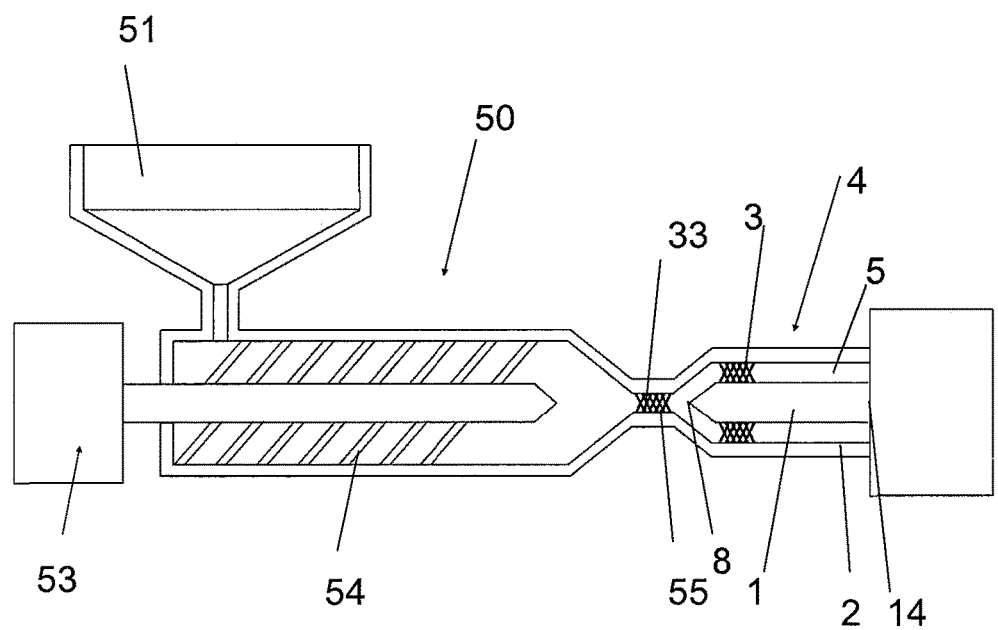
Figure 9:
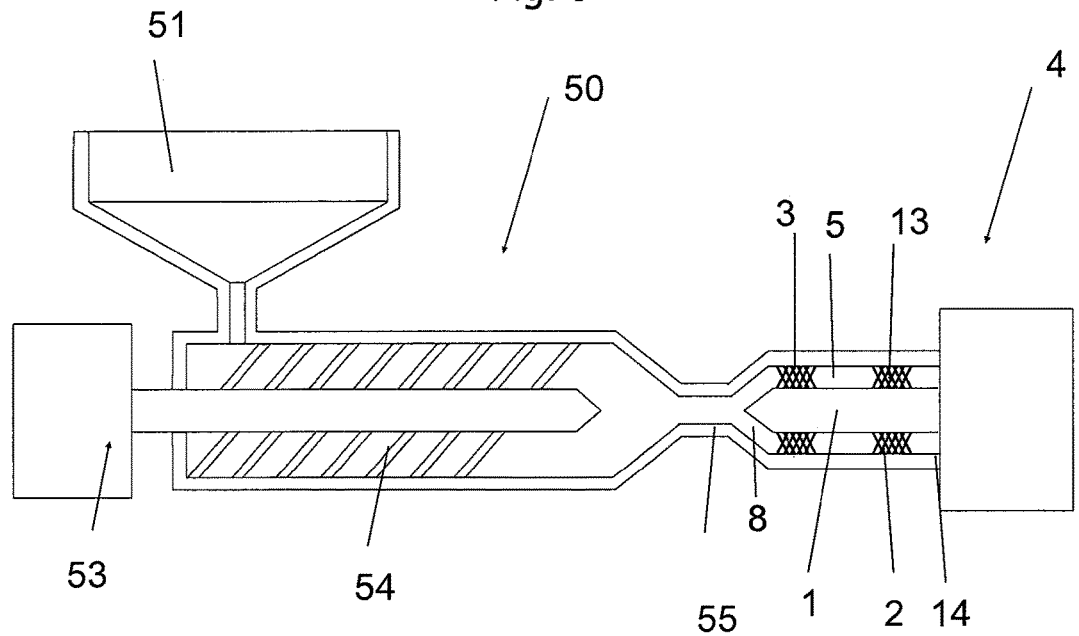
Figure 10:
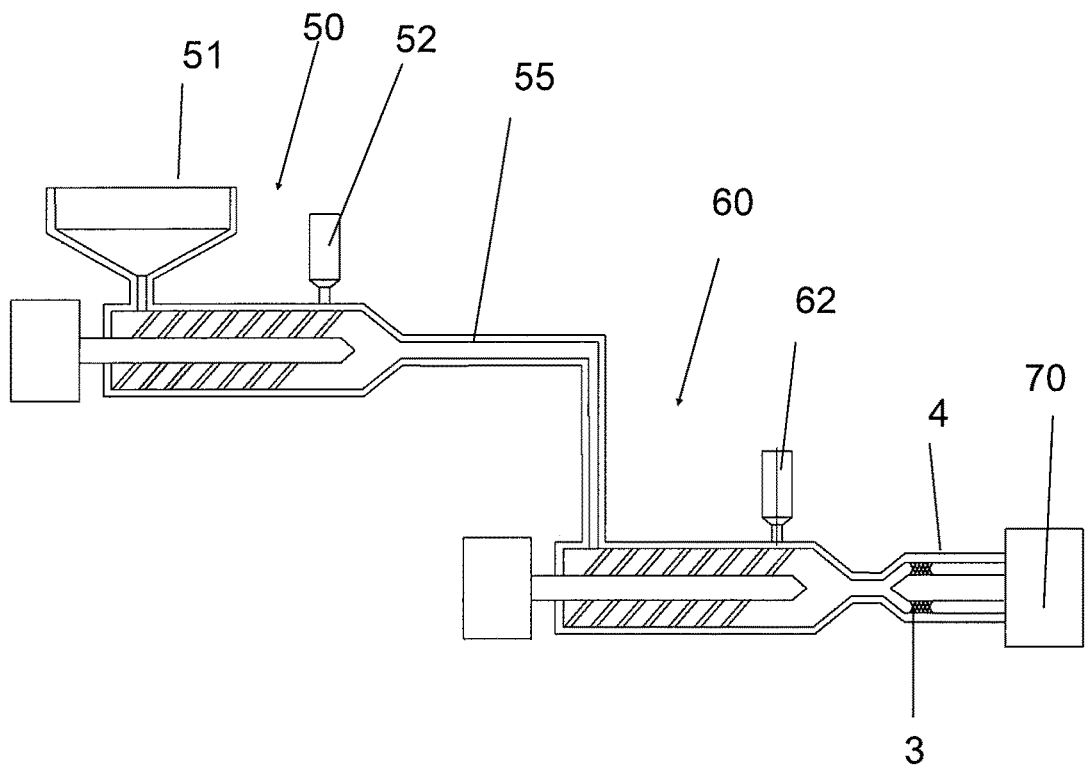

In the following the inventive device is shown in a number of embodiments. It is shown in:

FIG. 1a a two dimensional sectional view through a first embodiment of a device according to the prior art, FIG. 1b: a section along section plane A-A of FIG. 1a, FIG. 2a: a two dimensional sectional view through a second embodiment of a device according to the prior art, FIG. 2b: a section along section line A-A of FIG. 2a, FIG. 3a: a two dimensional sectional view through a third embodiment of a device according to the prior art, FIG. 3b: a section along section line A-A of FIG. 3a, FIG. 4a: a two dimensional sectional view through a forth embodiment of a device according to the prior art, FIG. 4b: a section along section line A-A of FIG. 4a, FIG. 5a: a two dimensional sectional view through a first embodiment of a device according to the invention, FIG. 5b: a section along section line A-A of FIG. 5a, FIG. 5c: a variant of FIG. 5a, FIG. 5d: a view on a device according to FIG. 5c in the direction of the longitudinal axis, FIG. 5e: a section along section line A-A through the device according to FIG. 5d, FIG. 5f: a section along section line B-B through the device according to FIG. 5e, FIG. 6: a three-dimensional representation of a second embodiment of a device according to the invention, FIG. 7: a three-dimensional representation of a third embodiment of a device according to the invention, FIG. 8: a first variant of an extrusion plant with the device according to the invention, FIG. 9: a second variant of the extrusion plant, FIG. 10: a third variant of the extrusion plant.

According to the prior art, a number of different support systems and deflecting elements for a device for manufacturing an annular extrudate are known. FIG. 1a and FIG. 1b show a web plate crosshead holder or a hole plate crosshead holder, which shall be described as first embodiment for a device 100 of the prior art for the manufacture of an annular extrudate. Upstream of the web plate crosshead holder an extruder is foreseen which is not shown in the drawings. The web plate crosshead holder consists of a crosshead 101 and a jacket 102 and an insert 103. The crosshead 101 is supported by the insert 103 in the jacket 102. The insert 103 contains at least an opening 104 for the polymer melt to enter through this opening into the annular passage 105. The polymer melt enters the jacket 102 by means of the supply opening 106. The supply opening 106 is in FIG. 1a arranged rotationally symmetrically about the longitudinal axis 107 of the jacket 102. From the supply opening 106, the polymer melt is directed into a conical distributor 108. The conical distributor encloses the cone 109 of the crosshead 101. According to this embodiment, a cylindrical portion 110 follows the cone 109, which holds the insert 103. Downstream of the insert, the crosshead has an enlargement 111. Due to the fact that the inner wall 112 of the jacket 102 has a cylindrical shape downstream of the insert 103, a reduction of the available flow cross-section results from the enlargement 111. At this location, an equalization of the flow velocity over the entire circumference of the annular passage 105 takes place due to the fact that the entire polymer melt has to pass this constriction. However, the melt can have a variable ductility due to local temperature variations, therefore variations in the flow velocity can't be completely excluded by the device according to FIG. 1a.

FIG. 1b shows the section along the plane A-A of FIG. 1a. The section passes the insert 103. The insert 103 contains in this embodiment four similar openings. According to an embodiment not shown in the drawing, also a plurality of openings with circular cross-section can be foreseen. The insert element 103 is received in the jacket 102 and encloses the cone 109. The crosshead 101 can be held in the inner space of the jacket 102 by the insert 103. The insert 103 allows also for a centering the crosshead 101 in the jacket 102, in particular at the end which contains the cone 109. However it has resulted as a disadvantage in this embodiment that the melt has to flow along a long path until the flow profile becomes uniform. Due to the deflection of the flow through the openings 104, a flow with a notable flow profile is obtained, which remains non-uniform over a considerable path length through the enlargement 111 and the resulting constriction of the annular passage 105. Quality problems may result if a melt with such a notable flow profile, that means a deviation of the minimal flow velocity and/or the maximal flow velocity of more than 20% from the medium flow velocity, is leaving the jacket. The extrudate can contain for instance an inhomogeneous surface, failure spots or streaks, which precludes the use of arrangements of crossheads according to FIG. 1a or FIG. 1b in many cases.

For this reason, alternative devices for the manufacture of an annular extrudate have been developed; the embodiment according to FIG. 2a or FIG. 2b shall be mentioned as an example. The device is known also under the name of spiral mandrel distributor. In a spiral mandrel distributor, the flow is directed laterally in two partial flow streams thereby bypassing a support element 203 which connects the crosshead 201 forming the inner part, the jacket 202 forming the outer part. Thereafter the partial flow streams are distributed over screw-type spirals to the annular passage 205. The spiral mandrel distributor consists of a crosshead 201 and a jacket 202 and a support element 2013. The jacket 202 has two jacket portions. The first jacket portion 212 extends from the discharge opening of the extruder to the support element 203. The second jacket portion 222 extends from the support element 203 to the discharge end of the jacket 202. The first jacket portion 212 contains a first distributor passage 208 and a second distributor passage 218. The polymer melt enters the first jacket portion 212 by a supply opening 206 from the extruder. The supply opening 206 is arranged in FIG. 2a rotationally symmetrically about the longitudinal axis 207 of the jacket 202. The polymer melt is directed from the supply opening 206 into the first distributor passage 208 and the second distributor passage 218.

According to this embodiment, the support element 203 follows the first jacket portion 212. The support element 203 is used for receiving the crosshead 201. A cylindrical portion follows the support element 203 which is referred to as second jacket portion 222. The crosshead 201 extends inside the inner space of the second jacket portion 222, whereby an annular passage 205 is formed between the second jacket portion 222 and the crosshead 201.

Downstream of the support element 203 the crosshead 201 is disposed with a spiral 211. As the inner wall of the second jacket portion 222 is cylindrical downstream of the support element 203, an enlargement and a subsequent constriction of the flow cross-section results from the spiral 211. At this location, an equalization of the flow velocity over the entire circumference of the annular passage 205 is obtained, as the complete polymer melt has to be advanced along the spiral 211. The melt can have a locally variable ductility during the advancing movement due to local temperature variations, whereby variations in the flow velocity can't be excluded entirely also by a device according to FIG. 2a. In addition, the viscous polymer melt has to be distributed from the discharge from the distributor passages 208, 210 onto the entire cross-section of the annular passage 205. This distribution results in a temporal delay, during which the melt can cool down, in particular if no additional heating devices are foreseen. A cooling down of the melt has negative effects on the flow behavior and can lead to an inhomogeneous melt flow at the discharge end of the annular passage, consequently the product quality of the polymer sheets or the polymer foil can deteriorate.

FIG. 2b shows a section along the plane A-A of FIG. 2a. The section passes the insert 203. The insert 103 contains in this embodiment a central opening, in which a first end 209 of a crosshead 201 is received. The second jacket portion 222 is received in the insert element 203 and encloses the crosshead 201 extending from the first end 209. The first distributor passage 208 and the second distributor passage 218 continue inside the crosshead 201 and discharge into the annular passage 205, which is formed by the outer surface of the crosshead 201 and the inner wall of the second jacket portion 222. In FIG. 2a, a first discharge opening 213 and a second discharge opening 223 of the corresponding distributor channel 208, 218 are shown.

A centering of the crosshead 201 in the jacket 202 is possible by the support element 203, in particular at its first end 209. However it has been also for this embodiment proven to be of a disadvantage that the melt has to travel a long path until the flow profile is equalized. Due to the deflection of the flow through the spiral 211, a flow with a notable flow profile is obtained, which continues through the enlargement 211 of the crosshead 201 and the connected annular enlargement and the resulting axial constriction of the annular passage 205 for a considerable path length. If a melt with such a notable flow profile, thus a deviation of the minimal velocity and/or the maximal velocity of more than 20% from the medium flow velocity, is discharged from the jacket, quality problems may result. The extrudate can contain for instance an inhomogeneous surface, failure spots or streaks, which precludes the use of arrangements of crossheads according to FIG. 2a or FIG. 2b in many cases in particular for melt flows with larger variations in the ductility.

Furthermore lattice basket holders are known as devices 300 for the manufacture of an annular extrudate according to FIG. 3a or FIG. 3b. In this embodiment the support element 303 consists of a lattice basket, which connects the inner part which is configured as a crosshead 301, from the rear side with the jacket 302 forming the outer part. The device 300 consists of a crosshead 301, a jacket 302 and a support element 303. The crosshead 301 is supported by the support element 303 in the jacket 302. The support element 303 contains at least one opening 304, such that the polymer melt enters the annular passage 305 by this opening 304. The polymer melt is supplied to the jacket 302 by a supply opening 306 from the extruder. The direction of flow of the polymer melt is shown by the arrows placed in the interior of the supply opening 306. The supply opening 306 is arranged in FIG. 3a rotationally symmetrically about the longitudinal axis 307 of the jacket 302. The polymer melt is directed from the supply opening 306 into a distributor channel 308. From the distributor channel 308 the polymer melt is supplied through the openings 304 of the support element 303 to the annular passage 305.

The first end of the crosshead 301 is configured as a cone 309. According to this embodiment, a cylindrical portion 310 extends from the cone 309. The crosshead 301 has an enlargement 311 downstream of the cylindrical portion 310. Due to the fact that the inner wall 312 of the jacket 302 is cylindrical downstream of the support element 303, the enlargement 311 results in a constriction of the flow cross-section. At this location an equalization of the flow velocity over the entire circumference of the annular passage 302 takes place, due to the fact that the entire polymer melt has to pass this constriction. However, the melt can have locally a variable ductility due to local temperature variations, whereby variations in the flow velocity can't be excluded also by a device according to FIG. 3a.

A further embodiment for a known device 400 for the manufacture of an annular extrudate is shown in FIG. 4a or FIG. 4b. This device is known under the name of side-fed holder. The device 400 consists of a crosshead 401 and a jacket 402 and a support element 403. The melt flow, that means the polymer melt, is supplied to the device 400 laterally and expands in constricting screw-type passages to the annular cross-section, whereby a portion of the melt is discharged continuously from the passage. The crosshead 401 is supported in the jacket 402 at the first end of the crosshead 401, such that the support element 403 is configured as a flange-type protrusion of the first end of the crosshead 401. The polymer melt is directed typically as a side stream past the support element 403, which connects the crosshead 401, forming the inner part, with the jacket 402, forming the outer part. Thereafter the side stream travels from the lateral distributor passage 408 into the distributor passage 409, which extends in a screw type manner along the surface of the crosshead 401 until it is discharged into the annular passage 405. A second distributor passage can be foreseen on the invisible rear side of the crosshead 401.

The polymer melt enters a base element 420 by a supply opening 406 from the extruder. The supply opening 406 is arranged in FIG. 4a laterally at the outer wall of the base element 420. The polymer melt is directed from the supply opening 406 to the lateral distributor passage 408. The lateral distributor passage 408 passes through the support element 403 and discharges into the bottom of a passage, which widens along the outer surface of the crosshead 401 along a screwed distributor passage 409, such that the polymer melt flowing through the distributor passage 409 flows not only along the narrowing distributor passage but also along the longitudinal axis 407 in the direction of the annular passage 405. A cylindrical portion follows at the end of the distributor passage 409, such that an annular melt flow is obtainable, which can form a tube or hose when leaving the device.

A gradual enlargement of the flow cross-section is obtained by the distributor passage 409. An extension of the flow to the circumference of the crosshead 401 is obtained at this stage. An equalization of the flow velocity for the entire circumference of the annular passage 405 can only be obtained if it is completely filled with polymer melt. During the advancing movement in the distributor passage 409, the melt can have a variable ductility due to local variations of temperature, such that variations in the flow velocity can also be expected with a device according to FIG. 4a. In addition, the viscous polymer melt has to be distributed onto the entire cross-section of the annular passage 405 after having been discharged from the distributor passage 409. The melt cools down if no additional heating devices are foreseen during this distribution which causes a temporal delay. A cooling down of the melt decreases flowability which can result in an inhomogeneous melt flow at the discharge end of the annular passage 405. Consequently the product quality of annular polymer sheets or a polymer foil can suffer.

FIG. 4b shows a section along the plane A-A of FIG. 4a. The section passes the support element 403. The support element 403 is configured as a flange-type protrusion of the first end of the crosshead 401. The lateral distributor passage 408 runs in this sectional plane parallel to the axis inside the crosshead 401 and discharges into the distributor passage 409. The insert 403 allows for a centering the crosshead 401 in the jacket 402. However a disadvantage of this embodiment is that the flow profile becomes uniform only after a long flow path. Due to the deflection of the flow through the lateral distributor passage 408 and the subsequent distributor passage 409 until subsequently fed into the annular passage 405, the notable flow profile created remains over a considerable path length. Quality problems may result if a melt with such a notable flow profile, that means a deviation of the minimal flow velocity and/or the maximal flow velocity of more than 20% from the medium flow velocity leaves the jacket. The extrudate can contain for instance an inhomogeneous surface, failure spots or streaks, which precludes the use of arrangements of crossheads according to FIG. 4a or FIG. 4b in many cases, in particular for melt flows with larger variations in the ductility.

FIG. 5a and FIG. 5b show an embodiment of a device 4 for the manufacture of an annular extrudate according to this invention. The device comprises a crosshead 1 and a jacket 2 and a static mixer 3, which assumes the function of a support element and an insert element for the crosshead 1. The crosshead 1 is supported by the static mixer 3 in the jacket 2. The polymer melt flows through the static mixer and enters the annular passage 5. The polymer melt is discharged from a supply opening 6 from the extruder into the jacket 2. The supply opening 6 is in FIG. 5a arranged rotationally symmetrically about the longitudinal axis 7 of the jacket 2. From the supply opening 6, the polymer melt is directed into a distributor passage 8. The distributor passage 8 encloses the cone 9 of the crosshead 1. According to this embodiment, a cylindrical portion 10 follows the cone 9, which is supported by the static mixer 3. Downstream of the static mixer 3, the crosshead 1 has an enlargement 11. Due to the fact that the inner wall 12 of the jacket 2 has a cylindrical shape downstream of the static mixer 3, a reduction of the available flow cross-section results from the enlargement 11. At this location, an equalization of the flow velocity over the entire circumference of the annular passage 5 takes place due to the fact that the entire polymer melt has to pass this constriction. Due to the fact that the melt has been homogenized by the static mixer, no local temperature variations result, therefore the polymer melt is homogeneous, that means that it has a uniform ductility over the entire cross-section of the annular passage. Herewith variations in the flow velocity can be substantially excluded such that an extrudate of a high quality is obtainable.

Optionally a second static mixer 13 can be arranged downstream of the static mixer 3 in the annular passage 5. According to a variant not shown in the drawings, a static mixer can be arranged in the supply passage which follows the supply opening 6 and/or a static mixer can be arranged in the distributor passage. Furthermore, additional support elements can be foreseen, which are not shown in the drawing, which can be configured according to any of the preceding embodiments.

FIG. 5b shows the section along the plane A-A of FIG. 5a. The section passes the static mixer 3. The static mixer 3 contains in this embodiment a plurality of web elements which belong to a first and a second group of web elements. The static mixer 3 is received in the jacket 2 and encloses the cone 9. The crosshead 1 can be held in the inner space of the jacket 2 by the static mixer 3. The static mixer 3 allows also for a centering the crosshead 1 in the jacket 2, in particular at the end which contains the cone 9. Due to the fact that in this embodiment the melt is homogenized directly at the discharge end of the static mixer 3 the flow velocity profile is homogeneous, whereby surprisingly, the flow is not required to travel a long flow path and the crosshead can have an overall length, which is smaller than four times the maximal diameter of the crosshead.

The deviation of the minimal flow velocity to the maximal flow velocity is not more than 10% from the medium flow velocity of the polymer melt leaving the jacket. The extrudate shows for instance no inhomogeneous surface, no failure spots, no streaks, whereby a good, constant product quality can be guaranteed.

FIG. 5c, FIG. 5d, FIG. 5e as well as FIG. 5f show a variant of the embodiment according to FIG. 5a or FIG. 5b for a device 4 for the manufacture of an annular extrudate according to this invention. The device comprises a crosshead 1 and a jacket 2 and a static mixer 3, which assumes the function of a support element or an insert element for the crosshead. The crosshead 1 is supported by the static mixer 3 in the jacket 2. The polymer melt flows through the static mixer 3 and enters the annular passage 5 (see FIG. 5e). The polymer melt is discharged from a supply opening 6 from the extruder into the jacket 2. The supply opening 6 is in FIG. 5a arranged rotationally symmetrically about the longitudinal axis 7 of the jacket 2. From the supply opening 6, the polymer melt is directed into a distributor passage 8. The distributor passage 8 encloses the cone 9 of the crosshead 1. According to this embodiment, a cylindrical portion 10 follows the cone 9, which is supported by the static mixer 3. Downstream of the static mixer 3, the crosshead 1 has an enlargement 11. Due to the fact that the inner wall 12 of the jacket 2 has a cylindrical shape downstream of the static mixer 3, a reduction of the available flow cross-section results from the enlargement 11. At this location, an equalization of the flow velocity over the entire circumference of the annular passage 5 takes place due to the fact that the entire polymer melt has to pass this constriction. Due to the fact that the melt has been homogenized by the static mixer 3, no local temperature variations result, therefore the polymer melt is homogeneous, that means that it has a uniform ductility over the entire cross-section of the annular passage. Herewith variations in the flow velocity can be substantially excluded such that an extrudate of a high quality is obtainable.

The static mixer 3 according to this embodiment comprises a first group 15 of web elements and a second group 16 of web elements. Each group can comprise a plurality of web elements. Depending on the width of the web elements and the diameter of the annular passage 5, 1 to 30, preferably 1 to 15, most preferred 1 to 5 web elements can belong to a group. Each of the first groups 15 of web elements is arranged next to each of the groups 16 of web elements. The web elements of the first group are arranged crosswise to the web elements of the second group. The web elements of each group are arranged advantageously in parallel. The static mixer according to this example is composed of about 30-50 first groups 15 and 30-50 second groups 16. Each of the first and second groups 15, 16 has therefore a concentrical orientation, that means the web elements are arranged along conical surfaces, whereby the tips of the cones formed by these conical surfaces are positioned on the longitudinal axis 7. The web elements are advantageously bar-shaped.

Optionally a second static mixer 13 can be arranged downstream of the static mixer 3 in the annular passage 5. According to a variant not shown in the drawings, a static mixer can be arranged in the supply passage which follows the supply opening 6 and/or a static mixer can be arranged in the distributor passage. The second static mixer 13 comprises insert elements which correspond to the insert elements of the first static mixer, however they are displaced about an angle, which is preferable 90 degrees, to the insert elements of the first static mixer. The insert elements comprise a first group 15 of web elements as well as a second group 16 of web elements. The web elements of the first group 15 are arranged crosswise to the web elements of the second group 16. However the elements of all the individual groups are not concentric with respect to the longitudinal axis, they extend tangentially to the inner surface, which is formed by the crosshead 1, as well as to the outer surface, which is formed by the inner wall 12 of the jacket 2. Each of the groups of web elements extends over a portion of the circumference such that—viewed in direction of the circumference—a plurality of groups 15, 16 of web elements are arranged in series. For instance one group 35 corresponding to the group 15 is displaced on the circumference of the crosshead 1. One group 36 corresponding to the group 16 is displaced on the circumference of the crosshead 1. Further comparable groups follow these groups 35, 36, however they are not designated in the figure. According to this embodiment the web elements of group 15 are arranged crosswise to the web elements of the group 16 as well as to the neighboring group 36, such that the orientation of the web elements of the group 16 is the same as the orientation of the web elements of the group 36. The web elements of the group 35 are arranged crosswise to the web elements of the group 16 as well as to the neighboring group 36, such that the orientation of the web elements of the group 16 is the same as the orientation of the web elements of the group 36. The orientation of the web elements of the group 15 is the same as the orientation of the web elements of the group 35.

The webs of the groups of web elements of the static mixer 3 as well as the static mixer 13 are displaced with respect to each other about an angle of about 90 degrees. Hereby a relocation of the flow can occur, whereby a mixing effect also for a viscous polymer melt is obtained already within a very short flow path length. By the use of two or more static mixers arranged in series in the direction of flow, a very good mixing result for the entire viscous polymer melt can be obtained for which more than twice the path length had been required according to the prior art for mixing.

In FIG. 5d a view of the device according to FIG. 5c is shown in direction of the longitudinal axis 7. The longitudinal axis 7 extends normal to the plane of the drawing. The section passes the static mixer 3. The static mixer 3 contains in this embodiment a plurality of web elements which belong to a first and a second group of web elements. The static mixer 3 is received in the jacket 2 and encloses the cone 9 which is not completely shown in FIG. 5c for not obstructing the view onto the rearmost web elements of the static mixer 3. The crosshead 1 can be held in the inner space of the jacket 2 by the static mixer 3. The static mixer 3 allows also for a centering the crosshead 1 in the jacket 2, in particular at the end which contains the cone 9. Due to the fact that in this embodiment the melt is homogenized directly at the discharge end of the static mixer 3, the flow velocity profile is homogeneous, whereby surprisingly, the flow is not required to travel a long flow path and the crosshead 1 can have an overall length, which is smaller than four times the maximal diameter of the crosshead. The deviation of the minimal flow velocity to the maximal flow velocity is not more than 10% from the medium flow velocity of the polymer melt leaving the jacket. The extrudate shows for instance no inhomogeneous surface, no failure spots, no streaks, whereby a good, constant product quality can be guaranteed.

FIG. 6 shows a static mixer 3 in a rather simplified perspective view. The static mixer 3 is arranged rotationally symmetrically about the longitudinal axis 7, which substantially extends in the main direction of flow of a flowable medium, such as a polymer melt, which flows through the jacket 2. The static mixer 3 according to this embodiment comprises a first group 15 of web elements and a second group 16 of web elements. Each group can comprise a plurality of web elements. Depending on the width of the web elements and the diameter of the annular passage 5, 1 to 30, preferably 1 to 15 web elements can belong to a group.

The web elements belonging to a group form a common cone, whereby the tip of the cone is positioned on the longitudinal axis 7 of the jacket 2 and the coaxially arranged crosshead 1. The tip of the cone, which is formed by the web elements of the first group 15 is positioned in this drawing below the assembly location of the static mixer 3. The tip of the cone, which is formed by the web elements of the second group 16 is positioned in this drawing above the assembly location of the static mixer 3. The enveloping surface of the cone which is formed by the first group 15 of web elements, cuts the enveloping surface of the cone which is formed by the second group 16 of web elements. If the web elements would not have a thickness, the cut would be a circle with a radius which is larger than the radius of the external wall of the crosshead, but smaller than the radius of the inner wall of the jacket. Due to the fact that the web elements have a thickness, the cut-out body is substantially an annular body. In case the web elements—as shown in the drawing—have planar flow surfaces substantially in trapezoid shape, the web elements of each group do not form a cone but an n-sided pyramid. The substitute n refers thereby to the amount of web elements belonging to a group.

The web elements of the first group and the web elements of the second group cross each other in the annular passage 5. A web element of the first group 15 is followed by a web element of the second group 16. The web element of the first group is arranged crosswise to the web element of the second group. The web elements of the first group alternate with the web elements of the second group.

The web elements are connected to the outer wall of the crosshead 1 on their first end. The web elements are connected to the inner wall of the jacket 2 on their second end. The outer wall of the crosshead 1 is represented in this drawing schematically by the ellipsoid shaped boundaries of the cylinder surface with small radius. The inner wall of the jacket 2 is represented in this drawing schematically by the ellipsoid shaped boundaries of the cylinder surface with a large radius. The annular passage extends between the crosshead 1 and the jacket 2.

Under the length of a web element it is intended the dimension from the first end 17 to the second end 18 of the web element along its central axis 19. Under the thickness of the web element it is intended the dimension normal to the central, axis form an upper edge shown in FIG. 6 to an opposite lower edge. Under the width of a web element, it is intended the dimension transverse to the direction of flow, whereby the direction of flow corresponds in FIG. 6 to the vertical direction as shown by the arrows 20.

The width of the web element can vary from its inner edge, which is located at the first end 17, to the outer edge, which is located at the second end 18. In particular, the width of the web element can increase from the first end 17 to the second end 18 along a sectional plane which is arranged normal to the central axis 19.

FIG. 7 shows a variant according to which the web elements comprise one or more passages 21 through which a heat exchange fluid can be circulated. The drawing shows only a portion of the web elements. In the same way as shown in FIG. 6 the web elements form two groups 15, 16, whereby neighboring web elements belong to different groups.

The passage 21 of the web element 25 of the first group 15 extends from a first end 17 to a second end 18 of the web element. The passage 21 can have a cross-sectional area in the shape of a round element. The round element can comprise one element from the group of circles, ellipses, rounded rectangles or polygons.

The static mixer 3 can be manufactured as a monolithical structure in a casting process, that means the static mixer 3 can be connected to a jacket body 30 which contains supply passages and discharge passages for a heat exchange fluid. The jacket body 30 is contained in the jacket 2. The jacket body 30 comprises a supply pipe and a discharge pipe for a heat exchange fluid. The jacket body 30 contains a distributor passage 31 for the distribution of a heat exchange fluid to a plurality of supply passages which are also not shown to keep the graphical representation as simple as possible.

The crosshead 1 contains a collection passage 32 for collecting the heat exchange fluid from a plurality of discharge passages. In particular a supply passage and a discharge passage are fluidly connected with the first and second end 16, 17 of the web element 25. For each of the web elements, which contain passages, at least a supply passage is foreseen, by means of which the heat exchange fluid is supplied to the corresponding passage in the web element and a discharge passage, by means of which the heat exchange fluid is discharged from the passage in the web element into a collection passage 32 of the crosshead 1. The heat exchange fluid is in this case discharged through the crosshead 1. The inverse flow path would also be possible. Furthermore, the jacket 2 and the crosshead 1 can each comprise distribution passages and collection passages.

In FIG. 7, the web elements 25, 26, 27 of the first group 15 are shown as well as the web elements 28, 29 of the second group 16. The passages in these web elements are mostly not shown, therefore they are not referenced.

The transition of at least one of the first and second ends 17, 18 of the web element 21 to the corresponding supply passage or discharge passage of the jacket body 30 of the jacket 2 is advantageously free from gaps.

According to an embodiment not shown in the drawing, the static mixer could contain a plurality of first groups 15 and second groups 16. For this reason, in the description, the first group 15 and the second group 16 are to be understood to represent also a plurality of the same or different first or second groups. The number of pairs of groups foreseen in a particular case depends on the specific mixing and heat transfer requirements. That means, if only a first and a second group are described in these application papers, it should not be deducted therefrom that only this particular embodiment is disclosed. Embodiments containing a plurality of pairs of groups, whereby each of these pairs of groups consists of a first group and a second group are to be included by the description or by reference. For simplicity and brevity, a repetition of this description for additional further pairs of groups is omitted.

The passages 21 are arranged inside the web elements, such that there is no connection between the passages inside the web elements and the mixing space, which surrounds the web elements. The mixing space extends in the annular passage 5.

The first and second groups 15, 16 form a cone which is inclined by an angle of inclination of 25 to 75 degrees with respect to the longitudinal axis 7. In the present figure, the angle of inclination is about 30 to 60 degrees with respect to the longitudinal axis 7, in a number of cases the angle of inclination is substantially 45 degrees with respect to the longitudinal axis 7.

If the static mixer 3 comprises a plurality of groups arranged in series, these groups arranged advantageously such, that they overlap to provide an active the largest possible heat exchange surface inside the volume bounded by the jacket 2. Under the term of an overlap, it is intended that at least a portion of the web element of a first group and a portion of the web element of a subsequent group and/or a portion of the web elements of a preceding groups are arranged in the same portion of the annular passage when viewed in the direction of flow. The projection of the length of a web element onto the longitudinal axis 7 results in a length L1 and the projection of the overlapping portion of the web element of the neighboring group onto the longitudinal axis 7 results in a length L2, whereby L2 is smaller than L1 and L2 is greater than zero. The observed annular passage portion is defined such that it has the length L1 plus the length L2, that means it corresponds to the enveloping volume of one of the web elements 25, 26, 27, 28, 29. The enveloping volume is for a cylindrical jacket with an annular passage of circular cross section a torus of a length L1 plus n-times L2, whereby n+1 is the number of groups arranged in total in the annular passage in series.

The passages in the web elements can have an oval or circular cross-section. The passages can also have other cross-sectional surfaces, such as triangular, rectangular or polygonal cross-sectional surfaces.

FIG. 8 shows a first variant of an extrusion plant including a static mixer according to any of the preceding embodiments. The extrusion plant consists of an extruder 50 and a transfer conduit 55, which connects the extruder 50 with a device 4, in which an annular extrudate is manufactured. The extruder contains a screw element 54 which is rotatable by a corresponding drive 53. The polymer can be supplied to the extruder by a hopper 51. The device comprises a jacket 2, a crosshead 1, which is arranged in the jacket 2. The jacket 2 contains a melt passage. The crosshead 1 is arranged in the melt passage, such that the melt passage extends at least at the discharge end 14 of the device in an annular configuration around the crosshead 1. An annular passage 5 is formed between the crosshead 1 and the jacket 2. The annular passage 5 contains a static mixer 3. The crosshead 1 is supported by the static mixer 3 in the jacket 2. A further static mixer 33 can be foreseen in the transfer conduit 55. Alternatively or in addition thereto, a static mixer can be arranged in the distribution passage 8, which extends between the transfer conduit 55 and the annular passage 5. The distribution passage is used for supplying the polymer melt to the annular passage 5.

FIG. 9 shows a second variant of an extrusion plant including a static mixer according to any of the preceding embodiments. The extrusion plant consists of an extruder 50 and a transfer conduit 55, which connects the extruder 50 with a device 4, in which an annular extrudate is manufactured. The extruder contains a screw element 54 which is rotatable by a corresponding drive 53. The polymer can be supplied to the extruder by a hopper 51. The device comprises a jacket 2 and a crosshead 1, which is arranged in the jacket 2. The jacket 2 contains a melt passage. The crosshead 1 is arranged in the melt passage, such that the melt passage extends at least at the discharge end 14 of the device in an annular configuration around the crosshead 1. An annular passage 5 is formed between the crosshead 1 and the jacket 2. The annular passage 5 contains a static mixer 3 and a further static mixer 13. The crosshead 1 is supported by the static mixers 3, 13 in the jacket 2.

FIG. 10 shows a third variant of an extrusion plant including a static mixer 3 according to any of the preceding embodiments. The extrusion plant consists of a first extruder 50, a second extruder 60 and a transfer conduit 55, which connects the first extruder 50 with the second extruder 60, and a device 4, through which the polymer melt leaves the extrusion plant. A method for manufacturing foams of low density can be performed in this extrusion plant. A polymer, supplied to the extruder by a hopper 51, is molten in the first extruder 50 to a polymer melt. A blowing agent is added to the polymer melt by a blowing agent supply device 52. Subsequently, the blowing agent is dissolved in the melt by mixing and dispersing processes in the first extruder 50 and/or in a mixing path formed by a static mixer or in the transfer passage 55 between the first extruder 50 and a second extruder 60 and/or in the second extruder 60. Thereafter, the melt containing the blowing agent is cooled in the second extruder 60, then the melt is introduced into the device 4. The device 4 contains the static mixer 3, by which the temperature of the melt can be equalized over the entire cross-section and which can be cooled or heated contemporaneously to reach the exact melt temperature. Thereafter the temperature stabilized cooled melt is discharged for instance over an annular die 70. The device is configured advantageously according to any of the preceding embodiments. By means of the static mixer 3, the temperature of the melt is advantageously equalized such that the lowest and the highest temperature in the melt cross-section after the static mixer differ less than 5 degrees. Celsius from each other. In particular, the temperature of the melt can be advantageously equalized such that the lowest and the highest temperature in the melt cross-section after the static mixer differ less than 3 degrees Celsius from each other, most preferred the lowest and the highest temperature differ less than 1.5 degrees Celsius from each other.

Advantageously the melt temperature after the mixer can be controlled by the coolable or heatable static mixer 3. Under the melt temperature after the static mixer, it is intended the temperature in the melt after the discharge of the melt from the static mixer 3, for instance at the discharge end of the jacket 2.

The blowing agent can be added by means of a blowing agent supply device 52 and/or the supply of polymer raw material in the hopper 51, which is foreseen at the first extruder 50. In addition or alternatively thereto, the blowing agent can be added by a blowing agent supply device 62, which is arranged at the second extruder 60 or by a supply device which is arranged in the transfer conduit 55. Thus, the blowing agent can be added to the melt in at least one of the first or second extruders or in the transfer conduit.

The invention is not limited to the previous embodiments of the devices and extrusion plants. The web elements can differ in their number and dimensions. Instead of web elements, tubular elements or surfacial elements can be foreseen, for instance wing elements. Furthermore, the number of passages in the web elements can vary depending on the heating or cooling requirement for the heat exchange. Depending on the intended use, the angle of inclination can vary which the groups enclose with the longitudinal axis. A plurality of the same, corresponding or different static mixers can be arranged in any sequence in series or can be arranged in the annular gap or in the path of the melt between the discharge of the extruder and the device.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of an element, component or compound selected from the group consisting of A, B, C . . . and N, the text should be interpreted as requiring only one element from the group, not A plus N, or B plus N, or any other combination of two or more elements, components or compounds of this group.

The invention claimed is:

1. A device for the manufacture of an annular extrudate to form a tube or hose when leaving the device, comprising a stationary jacket, a stationary crosshead arranged inside of the jacket, whereby the jacket contains a melt passage, whereby the crosshead is arranged in the melt passage, such that the melt passage extends at least at the outlet of the device as an annular melt passage around the crosshead, such that an annular passage is formed between the crosshead and the jacket, whereby the annular passage contains a static mixer, whereby the crosshead is supported by the static mixer in the jacket, such that the crosshead is fixed to the jacket by the static mixer, whereby the static mixer comprises a plurality of inserts, whereby at least a portion of the inserts is connected to the crosshead and the jacket, wherein a die element is arranged at the discharge end of the melt flow from the annular passage which is shaped as an annular nozzle.

2. The device according to claim 1, wherein the inserts have a length, a width and a thickness, whereby the length of the inserts is greater than the normal distance between the inner wall of the jacket and the outer wall of the crosshead.

3. The device according to claim 2, whereby the width of the inserts is smaller than the normal distance between the inner wall of the jacket and the outer wall of the crosshead.

4. The device according to claim 2, whereby the width of the inserts is smaller than half the normal distance between the inner wall of the jacket and the outer wall of the crosshead.

5. The device according to claim 1, whereby the inserts comprise annular, tubular, bar-shaped or planar, e.g. wing-shaped web elements.

6. The device according to claim 1, whereby at least a portion of the inserts forms a passage for a heat exchange fluid.

7. The device according to claim 1, whereby at least a portion of the inserts is configured as web elements, whereby at least a portion of the web elements form a group.

8. The device according to claim 7, whereby each of the web elements has a central axis, whereby at least one of the central axes of the web elements belonging to the group is arranged in a constant angle to the central axis of the static mixer.

9. The device according to claim 1, whereby the inserts comprise a first group of web elements and a second group of web elements, whereby the first group is arranged crosswise to the second group.

10. The device according to claim 9, whereby a passage extends from a first end of the web element to a second end of the web element.

11. The device according to claim 10, whereby the jacket and/or the crosshead each contain a corresponding passage, which is in fluid connection with the corresponding first end and the second end of the web element.

12. The device according to claim 1, wherein the annular passage contains a plurality of static mixers, which are arranged in series in flow direction.

13. The device according to claim 1, wherein the annular passage contains a first static mixer and a second static mixer.

14. The device according to claim 13, whereby the first static mixer is arranged at a distance to the second static mixer.

15. The device according to claim 1, wherein a first static mixer and a second static mixer are foreseen having at least partially overlapping insert elements.

16. The device according to claim 1, wherein the distance between the static and the discharge end of the device is at most 30 cm.

* * * * *